United States Patent
Li et al.

(10) Patent No.: US 11,476,972 B2
(45) Date of Patent: Oct. 18, 2022

(54) UPLINK CONTROL INFORMATION TRANSMISSION METHOD AND DEVICE

(71) Applicant: Huawei Technologies Co., Ltd., Shenzhen (CN)

(72) Inventors: Shengyu Li, Beijing (CN); Yongxia Lyu, Ottawa (CA); Jiafeng Shao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 16/874,166

(22) Filed: May 14, 2020

(65) Prior Publication Data
US 2020/0274637 A1 Aug. 27, 2020

Related U.S. Application Data

(63) Continuation of application No. PCT/CN2018/114645, filed on Nov. 8, 2018.

(30) Foreign Application Priority Data

Nov. 17, 2017 (CN) .......................... 201711164924.5

(51) Int. Cl.
*H04L 1/00* (2006.01)
*H04W 72/04* (2009.01)
(Continued)

(52) U.S. Cl.
CPC ......... *H04L 1/0004* (2013.01); *H04W 72/042* (2013.01); *H04W 72/0413* (2013.01); *H04W 72/1273* (2013.01); *H04W 80/08* (2013.01)

(58) Field of Classification Search
CPC ... H04L 1/0004; H04L 5/0053; H04L 1/0001; H04L 1/0009; H04L 1/1671;
(Continued)

(56) References Cited

U.S. PATENT DOCUMENTS

2012/0243511 A1 9/2012 Lv et al.
2013/0114391 A1 5/2013 Jang et al.
(Continued)

FOREIGN PATENT DOCUMENTS

| CN | 102025467 A | 4/2011 |
|---|---|---|
| CN | 102870367 A | 1/2013 |
| CN | 103796318 A | 5/2014 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 14)," 3GPP TS 36.212 V14.4.0, Sep. 2017, 198 pages.
(Continued)

*Primary Examiner* — Sharmin Chowdhury
(74) *Attorney, Agent, or Firm* — Slater Matsil, LLP

(57) ABSTRACT

An uplink control information transmission method and a device. The method includes obtaining a first modulation and coding scheme offset value used to multiplex first uplink control information on a physical uplink shared channel, where the first modulation and coding scheme offset value is less than 1, and mapping, according to the first modulation and coding scheme offset value, the first uplink control information to a resource for the physical uplink shared channel, to transmit the first uplink control information to a network device using the resource for the physical uplink shared channel.

14 Claims, 15 Drawing Sheets

(51) Int. Cl.
H04W 72/12 (2009.01)
H04W 80/08 (2009.01)

(58) Field of Classification Search
CPC ... H04L 1/1861; H04L 1/0072; H04L 1/0026; H04W 72/0413; H04W 72/042; H04W 72/1273; H04W 80/08
See application file for complete search history.

(56) References Cited

U.S. PATENT DOCUMENTS

| | | | |
|---|---|---|---|
| 2015/0289211 A1 | 10/2015 | Lee et al. | |
| 2019/0007182 A1* | 1/2019 | Li | H04W 72/0446 |
| 2019/0190663 A1* | 6/2019 | Sahlin | H04L 1/1854 |
| 2019/0199468 A1* | 6/2019 | Zhao | H04L 1/0025 |
| 2020/0374917 A1* | 11/2020 | Takeda | H04L 5/0044 |

OTHER PUBLICATIONS

"3rd Generation Partnership Project; Technical Specification Group Radio Access Network; Evolved Universal Terrestrial Radio Access (E-UTRA); Physical layer procedures (Release 14) 3rd Generation Partnership Project; Technical Specification Group Radio Access Network; Physical layer procedures (Release 14)," 3GPP TS 36.213 V14.4.0, Sep. 2017, 461 pages.

"3rd Generation Partnership Project; Technical Specification Group Radio Access Network; Evolved Universal Terrestrial Radio Access (E-UTRA); Physical layer procedures (Release 13)." 3GPP TS 36.213 V13.0.0, Dec. 2015, 326 pages.

"UCI on PUSCH for Carrier Aggregation Enhancement Beyond 5 Carriers," Agenda Item: 7.2.2.1.4, Source: Huawei, HiSilicon, Document for: Discussion and decision, 3GPP TSG RAN WG1 Meeting #82, R1-154337, Beijing, China, Aug. 24-28, 2015, 3 pages.

* cited by examiner

UPLINK CONTROL INFORMATION TRANSMISSION METHOD AND DEVICE

CROSS-REFERENCE TO RELATED APPLICATIONS

This application is a continuation of International Patent Application No. PCT/CN2018/114645, filed on Nov. 8, 2018, which claims priority to Chinese Patent Application No. 201711164924.5, filed on Nov. 17, 2017. The disclosures of the aforementioned applications are hereby incorporated by reference in their entireties.

TECHNICAL FIELD

Embodiments of this application relate to communications technologies, and in particular, to an uplink control information transmission method and a device.

BACKGROUND

A fifth generation (5G) communications system is dedicated to supporting higher system performance and supports a plurality of service types, different deployment scenarios, and a wider spectral range. The plurality of service types include enhanced mobile broadband (eMBB), massive machine type communication (mMTC), ultra-reliable and low-latency communications (URLLC), multimedia broadcast multicast service (MBMS), positioning service, and the like. The different deployment scenarios include an indoor hotspot scenario, a dense urban scenario, a suburban scenario, an urban macro scenario, a high-speed railway scenario, and the like. The wider spectral range is a spectral range up to 100 GHz that is supported by 5G, includes a low-frequency part less than 6 GHz, and also includes a high-frequency part ranging from 6 GHz to 100 GHz.

A major feature of the 5G communications system, in comparison with a 4G communications system, is support for an ultra-reliable and low-latency service. There are a plurality of types of URLLC services, and typical application examples include industrial control, industrial production process automation, human-computer interaction, telemedicine, and the like. To better quantify a performance indicator of the URLLC service, and provide a reference input and an evaluation criterion for a 5G system design, the performance indicator of the URLLC service includes a latency, reliability, and a system capacity.

To meet high reliability and low latency requirements of URLLC, 3GPP designs a set of solutions for 5G NR (New Radio). For example, for downlink transmission, first, a lower coding rate is provided to improve reliability of a single transmission, and a larger subcarrier spacing and a shorter transmission symbol are supported to provide more repeat transmission opportunities. As an indispensable part of overall transmission, a hybrid automatic repeat request response-acknowledgement/negative acknowledgement (HARQ-ACK/NACK) feedback of downlink data transmission is very important. To support more reliable downlink data transmission, corresponding HARQ-ACK/NACK transmission needs to have a lower bit error rate. In addition, more accurate channel quality information helps improve downlink resource utilization, and is also important for improving overall transmission reliability of a network with heavy load. Therefore, the 5G NR also needs to support a lower channel state information (CSI) transmission bit error rate. That is, transmission of uplink control information (UCI) needs to be improved, including providing a lower transmission bit error rate and a shorter feedback latency.

In addition, uplink transmission also needs to support a URLLC service. Uplink transmission should be capable of supporting a lower coding rate to improve transmission reliability of uplink transmission, and uplink transmission should support grant-free (GF) transmission to reduce a waiting latency.

Considering that uplink control information UCI needs to be carried on an uplink control channel (PUCCH), and uplink data transmission needs to be carried on an uplink shared channel (PUSCH), but a current R15 version of NR does not support simultaneous transmission on the PUCCH and the PUSCH, a more proper and effective uplink control information transmission method needs to be designed.

SUMMARY

Embodiments of this application provide an uplink control information transmission method and a device, so that more resources can be allocated to uplink data on a physical uplink shared channel. This improves transmission reliability of the uplink data, to meet a requirement of the terminal device on a service, for example, a URLLC service.

According to a first aspect, an embodiment of this application provides an uplink control information transmission method, including obtaining a first modulation and coding scheme offset value used to multiplex and transmit first uplink control information on a physical uplink shared channel, where the first modulation and coding scheme offset value is less than 1, and mapping, based on the first modulation and coding scheme offset value, the first uplink control information to a resource for the physical uplink shared channel, to transmit the first uplink control information.

With reference to the first aspect, in a possible implementation of the first aspect, the obtaining a first modulation and coding scheme offset value used to multiplex and transmit first uplink control information on a physical uplink shared channel includes receiving first downlink control information, where the first downlink control information is used to schedule the physical uplink shared channel and/or the first uplink control information, and the resource for the physical uplink shared channel and an uplink control channel resource that carries the first uplink control information overlap in time domain, and determining the first modulation and coding scheme offset value based on a format of the first downlink control information.

With reference to the first aspect or the possible implementation of the first aspect, in another possible implementation of the first aspect, the format of the first downlink control information is determined based on a quantity of bits in the first downlink control information, indication information of at least one preset bit field in the first downlink control information, or a type of search space that carries the first downlink control information.

With reference to any one of the first aspect or the possible implementations of the first aspect, in another possible implementation of the first aspect, the determining the first modulation and coding scheme offset value based on a format of the first downlink control information includes when the first downlink control information is compact downlink control information, determining that the first modulation and coding scheme offset value is a first preset value, where the first preset value is a value configured by using higher layer signaling or a predefined value.

With reference to any one of the first aspect or the possible implementations of the first aspect, in another possible implementation of the first aspect, the method further includes receiving higher layer signaling, where the higher layer signaling is used to indicate configuration information for a modulation and coding scheme offset value used to multiplex uplink control information on a physical uplink shared channel, and the determining the first modulation and coding scheme offset value based on a format of the first downlink control information includes determining at least one a type and a payload size of the first uplink control information, and determining the first modulation and coding scheme offset value based on the configuration information for a modulation and coding scheme offset value, the at least one of the type and the payload size of the first uplink control information, and the format of the first downlink control information.

With reference to any one of the first aspect or the possible implementations of the first aspect, in another possible implementation of the first aspect, the obtaining a first modulation and coding scheme MCS offset value used to multiplex first uplink control information on a physical uplink shared channel includes receiving higher layer signaling, where the higher layer signaling is used to indicate configuration information for a modulation and coding scheme offset value used to multiplex and transmit uplink control information on a grant-free physical uplink shared channel, receiving second downlink control information, where the second downlink control information is used to schedule the first uplink control information, and an uplink control channel resource that carries the first uplink control information and a resource for the grant-free physical uplink shared channel overlap in time domain, and determining the first modulation and coding scheme offset value based on the configuration information for a modulation and coding scheme offset value and/or a format of the second downlink control information.

With reference to any one of the first aspect or the possible implementations of the first aspect, in another possible implementation of the first aspect, the determining the first modulation and coding scheme offset value based on the configuration information for a modulation and coding scheme offset value and/or a format of the second downlink control information includes determining at least one of a type and a payload size of the first uplink control information, and determining the first modulation and coding scheme offset value based on the configuration information for a modulation and coding scheme offset value used to multiplex uplink control information on a physical uplink shared channel, the at least one of the type and the payload size of the first uplink control information, and the format of the second downlink control information.

With reference to any one of the first aspect or the possible implementations of the first aspect, in another possible implementation of the first aspect, the method further includes obtaining a second modulation and coding scheme offset value used to multiplex and transmit second uplink control information on the physical uplink shared channel, where the second modulation and coding scheme offset value is greater than or equal to 1, or less than 1, and the mapping, based on the first modulation and coding scheme offset value, the first uplink control information to a resource for the physical uplink shared channel, to transmit the first uplink control information includes mapping, based on the first modulation and coding scheme offset value and/or the second modulation and coding scheme offset value, the first uplink control information and the second uplink control information to the resource for the physical uplink shared channel, to transmit the first uplink control information and the second uplink control information.

With reference to any one of the first aspect or the possible implementations of the first aspect, in another possible implementation of the first aspect, the obtaining a second modulation and coding scheme offset value used to multiplex second uplink control information on the physical uplink shared channel includes receiving higher layer signaling, where the higher layer signaling is used to indicate the second modulation and coding scheme offset value used to multiplex the second uplink control information on the physical uplink shared channel, and obtaining, based on the higher layer signaling, the second modulation and coding scheme offset value used to multiplex the second uplink control information on the physical uplink shared channel, receiving higher layer signaling and at least one piece of third downlink control information, where the higher layer signaling indicates a configuration table of the second modulation and coding scheme offset value used to multiplex and transmit the second uplink control information on the physical uplink shared channel, different elements in the table have different numbers and different modulation and coding scheme offset values corresponding to the different numbers, the at least one piece of third downlink control information is used to schedule a physical downlink shared channel and/or the second uplink control information, and indicate a value number of the second modulation and coding scheme offset value used to multiplex and transmit the second uplink control information on the physical uplink shared channel, and the resource for the physical uplink shared channel and an uplink control channel resource that carries the second uplink control information overlap in time domain, and obtaining, based on the at least one piece of third downlink control information, the second modulation and coding scheme offset value used to multiplex the second uplink control information on the physical uplink shared channel, or receiving at least one piece of third downlink control information, where the at least one piece of third downlink control information is used to schedule a physical downlink shared channel and/or the second uplink control information, and indicate a value number of the second modulation and coding scheme offset value used to multiplex and transmit the second uplink control information on the physical uplink shared channel, the resource for the physical uplink shared channel and an uplink control channel resource that carries the second uplink control information overlap in time domain, and obtaining, based on the at least one piece of third downlink control information and predefined information, the second modulation and coding scheme offset value used to multiplex the second uplink control information on the physical uplink shared channel.

With reference to any one of the first aspect or the possible implementations of the first aspect, in another possible implementation of the first aspect, the obtaining, based on the at least one piece of third downlink control information, the second modulation and coding scheme offset value used to multiplex the second uplink control information on the physical uplink shared channel includes determining the second modulation and coding scheme offset value based on a format of the at least one piece of third downlink control information.

With reference to the first aspect or the possible implementations of the first aspect, in another possible implementation of the first aspect, the method further includes determining the format of the third downlink control information based on a quantity of bits in the third downlink control information, indication information of at least one preset bit field in the third downlink control information, or a type of search space that carries the third downlink control information.

With reference to any one of the first aspect or the possible implementations of the first aspect, in another possible implementation of the first aspect, the obtaining, based on the at least one piece of third downlink control information, the second modulation and coding scheme offset value used to multiplex the second uplink control information on the physical uplink shared channel includes respectively obtaining a receiving time difference between the first downlink control information and the at least one piece of third downlink control information, and determining the second modulation and coding scheme offset value based on the receiving time difference between the first downlink control information and the at least one piece of third downlink control information.

In the foregoing process of determining the second modulation and coding scheme offset value, when the at least one piece of third downlink control information is a plurality of pieces of third downlink control information, a modulation and coding scheme offset value corresponding to each piece of third downlink control information may be determined, and a terminal device determines the second modulation and coding scheme offset value based on one or more of modulation and coding scheme offset values corresponding to the plurality of pieces of third downlink control information.

According to a second aspect, an embodiment of this application provides an uplink control information transmission method, including sending a first modulation and coding scheme offset value, where the first modulation and coding scheme offset value is less than 1, and receiving first uplink control information on a physical uplink shared channel based on the first modulation and coding scheme offset value.

With reference to the second aspect, in a possible implementation of the second aspect, the sending a first modulation and coding scheme offset value includes sending first downlink control information, where the first downlink control information is used to schedule the physical uplink shared channel and/or the first uplink control information, a resource for the physical uplink shared channel and an uplink control channel resource that carries the first uplink control information overlap in time domain, and a format of the first downlink control information is used to indicate the first modulation and coding scheme offset value.

With reference to the second aspect or the possible implementation of the second aspect, in another possible implementation of the second aspect, the sending a first modulation and coding scheme offset value includes sending higher layer signaling, where the higher layer signaling is used to indicate configuration information for a modulation and coding scheme offset value used to multiplex and transmit uplink control information on a grant-free physical uplink shared channel, and sending second downlink control information, where the second downlink control information is used to schedule the first uplink control information, and a format of the second downlink control information is used to instruct a terminal device to determine the first modulation and coding scheme offset value based on the configuration information for a modulation and coding scheme offset value and/or the format of the second downlink control information.

With reference to any one of the second aspect or the possible implementations of the second aspect, in another possible implementation of the second aspect, the method further includes sending a second modulation and coding scheme offset value, where the second modulation and coding scheme offset value is greater than or equal to 1, or the second modulation and coding scheme offset value is less than 1, and receiving the first uplink control information and second uplink control information on the physical uplink shared channel based on the first modulation and coding scheme offset value and/or the second modulation and coding scheme offset value.

With reference to any one of the second aspect or the possible implementations of the second aspect, in another possible implementation of the second aspect, the sending a second modulation and coding scheme offset value includes sending higher layer signaling, where the higher layer signaling is used to indicate the second modulation and coding scheme offset value used to multiplex the second uplink control information on the physical uplink shared channel, or sending at least one piece of third downlink control information, where the at least one piece of third downlink control information is used to indicate the second modulation and coding scheme offset value used to multiplex the second uplink control information on the physical uplink shared channel.

With reference to any one of the second aspect or the possible implementations of the second aspect, in another possible implementation of the second aspect, the sending at least one piece of third downlink control information includes sending the at least one piece of third downlink control information, where a format of the at least one piece of third downlink control information is used to indicate the second modulation and coding scheme offset value used to multiplex the second uplink control information on the physical uplink shared channel.

With reference to any one of the second aspect or the possible implementations of the second aspect, in another possible implementation of the second aspect, the sending at least one piece of third downlink control information includes sending the at least one piece of third downlink control information, where a receiving time difference between the first downlink control information and the at least one piece of third downlink control information is used to indicate the second modulation and coding scheme offset value.

According to a third aspect, an embodiment of this application provides an uplink control information transmission method, including obtaining, by a communications device, a target block error rate value of uplink data, where the uplink data is uplink data carried on a physical uplink shared channel PUSCH, obtaining, by the communications device, a target block error rate value of uplink control information UCI and a payload size of the UCI, and determining, by the communications device based on the target block error rate value of the uplink data, the target block error rate value of the UCI, the payload size of the UCI, and an MCS offset value mapping manner, a modulation and coding scheme MCS offset value used to multiplex and transmit the UCI on the PUSCH.

With reference to the third aspect, in a possible implementation of the third aspect, the MCS offset value mapping manner includes an MCS offset value mapping function $f$, and the determining, by the communications device based on the target block error rate value of the uplink data, the target block error rate value of the UCI, the payload size of the UCI, and an MCS offset value mapping manner, a modulation and coding scheme MCS offset value used to multiplex and transmit the UCI on the PUSCH includes determining, by the communications device based on $\beta = f$ (BLER$_1$, BLER$_2$, P), the modulation and coding scheme MCS offset value used to multiplex and transmit the UCI on the PUSCH, where β is the modulation and coding scheme MCS offset value used to multiplex and transmit the UCI on the PUSCH, β<1 or β≥1, BLER$_1$ is the target block error rate value of the uplink data, BLER$_2$ is the target block error rate value of the UCI, and P is the payload size of the UCI.

With reference to the third aspect or the possible implementation of the third aspect, in another possible implementation of the third aspect, the MCS offset value mapping function $f$ satisfies the following conditions:

when $x_1 \leq x_2, f(x_1, BLER_2, P) \leq f(x_2, BLER_2, P)$;

when $y_1 \leq y_2, f(BLER_1, y_1, P) \geq f(BLER_1, y_2, P)$; and when $P_1 \leq P_2, f(BLER_1, BLER_2, P_1) \geq f(BLER_1, BLER_2, P_2)$.

With reference to any one of the third aspect or the possible implementations of the third aspect, in another possible implementation of the third aspect, the MCS offset value mapping manner includes an MCS offset value mapping table, and each row in the MCS offset mapping table is represented by [BLER$_1$, BLER$_2$, P, β], and the determining, by the communications device based on the target block error rate value of the uplink data, the target block error rate value of the UCI, the payload size of the UCI, and an MCS offset value mapping manner, a modulation and coding scheme MCS offset value used to multiplex and transmit the UCI on the PUSCH includes determining, by the communications device through matching in the MCS offset value mapping table based on the target block error rate value of the uplink data, the target block error rate value of the UCI, and the payload size of the UCI, the modulation and coding scheme MCS offset value used to multiplex and transmit the UCI on the PUSCH.

With reference to any one of the third aspect or the possible implementations of the third aspect, in another possible implementation of the third aspect, the MCS offset value mapping table satisfies the following conditions:

for any two rows $[x_1, BLER_2, P, \beta_1]$ and $[x_2, BLER_2, P, \beta_2]$, when $x_1 \leq x_2, \beta_1 \leq \beta_2$;

for any two rows $[BLER_1, P, \beta_1]$ and $[BLER_1, y_2, P, \beta_2]$, when $y_1 \leq y_2, \beta_1 \geq \beta_2$;

and for any two rows $[BLER_1, BLER_1, P_1, \beta_1]$ and $[BLER_1, BLER_1, P_2, \beta_2]$, when $P_1 \leq P_2, \beta_1 \geq \beta_2$.

With reference to any one of the third aspect or the possible implementations of the third aspect, in another possible implementation of the third aspect, the communications device is a terminal device or a network device.

With reference to any one of the third aspect or the possible implementations of the third aspect, in another possible implementation of the third aspect, when the communications device is a terminal device, the obtaining, by a communications device, a target block error rate value of uplink data includes receiving, by the terminal device, first downlink control information sent by a network device, where the first downlink control information includes first indication information, and determining, by the terminal device, the target block error rate value of the uplink data based on the first indication information, or receiving, by the terminal device, first downlink control information sent by a network device, and when the first downlink control information is of a specific format, determining, by the terminal device, the target block error rate value of the uplink data based on the specific format of the first downlink control information.

With reference to any one of the third aspect or the possible implementations of the third aspect, in another possible implementation of the third aspect, when the communications device is the terminal device, the obtaining, by the communications device, a target block error rate value of uplink control information UCI and a payload size of the UCI includes receiving, by the terminal device, second downlink control information sent by the network device, where the second downlink control information includes second indication information, and determining, by the terminal device, the target block error rate value of the UCI and the payload size of the UCI based on the second indication information, or receiving, by the terminal device, second downlink control information sent by the network device, and when the second downlink control information is of a specific format, determining, by the terminal device, at least one of the target block error rate value of the UCI and the payload size of the UCI based on the specific format of the second downlink control information.

With reference to any one of the third aspect or the possible implementations of the third aspect, in another possible implementation of the third aspect, the target block error rate value of the UCI includes a target block error rate value corresponding to HARQ-ACK/NACK feedback information corresponding to a physical downlink shared channel PDSCH and a target block error rate value corresponding to channel state information CSI, and the payload size of the UCI includes a payload size corresponding to the HARQ-ACK/NACK feedback information corresponding to the physical downlink shared channel PDSCH and a payload size corresponding to the CSI.

According to a fourth aspect, an embodiment of this application provides an apparatus. The apparatus may be a terminal device, or a structural component of a terminal device, or an apparatus that is structurally independent of a terminal device. The apparatus has a function of implementing behavior of the terminal device in any one of the first aspect or the implementations of the first aspect, or in any one of the third aspect or the implementations of the third aspect. The function may be implemented by hardware, or may be implemented by hardware executing corresponding software. The hardware or the software includes one or more modules corresponding to the foregoing function.

According to a fifth aspect, an embodiment of this application provides an apparatus. The apparatus may be a terminal device, or a structural component of a terminal device, or an apparatus that is structurally independent of a terminal device. The apparatus includes a processor, a memory, a bus, and a communications interface. The memory is configured to store a computer executable instruction. The processor is connected to the memory by using the bus. When the terminal device runs, the processor executes the computer executable instruction stored in the memory, to enable the terminal device to perform the uplink control information transmission method in any one of the first aspect or the implementations of the first aspect, or in any one of the third aspect or the implementations of the third aspect.

According to a sixth aspect, an embodiment of this application provides a computer readable storage medium, configured to store a computer software instruction used by the foregoing terminal device. When the computer software instruction is run on a computer, the computer is enabled to perform the uplink control information transmission method in any one of the first aspect or the implementations of the first aspect, or in any one of the third aspect or the implementations of the third aspect.

According to a seventh aspect, an embodiment of this application provides a computer program product including an instruction. When the computer program product runs on a computer, the computer is enabled to perform the uplink control information transmission method in any one of the first aspect or the implementations of the first aspect, or in any one of the third aspect or the implementations of the third aspect.

According to an eighth aspect, an embodiment of this application provides an apparatus. The apparatus may be a network device, or a structural component of a network device, or an apparatus that is structurally independent of a network device. The apparatus has a function of implementing behavior of the network device in any one of the second aspect or the implementations of the second aspect, or in any one of the third aspect or the implementations of the third aspect. The function may be implemented by hardware, or may be implemented by hardware executing corresponding software. The hardware or the software includes one or more modules corresponding to the foregoing function.

According to a ninth aspect, an embodiment of this application provides an apparatus. The apparatus may be a network device, or a structural component of a network device, or an apparatus that is structurally independent of a network device. The apparatus includes a processor, a memory, a bus, and a communications interface. The memory is configured to store a computer executable instruction. The processor is connected to the memory by using the bus. When the network device runs, the processor executes the computer executable instruction stored in the memory, to enable the network device to perform the uplink control information transmission method in any one of the second aspect or the implementations of the second aspect, or in any one of the third aspect or the implementations of the third aspect.

According to a tenth aspect, an embodiment of this application provides a computer readable storage medium, configured to store a computer software instruction used by the foregoing network device. When the computer software instruction is run on a computer, the computer is enabled to perform the uplink control information transmission method in any one of the second aspect or the implementations of the second aspect, or in any one of the third aspect or the implementations of the third aspect.

According to an eleventh aspect, an embodiment of this application provides a computer program product including an instruction. When the computer program product runs on a computer, the computer is enabled to perform the uplink control information transmission method in any one of the second aspect or the implementations of the second aspect, or in any one of the third aspect or the implementations of the third aspect.

According to a twelfth aspect, an embodiment of this application provides a chip, including a memory and a processor, where the memory is configured to store a program instruction, and the processor is configured to invoke the program instruction stored in the memory, to perform the uplink control information transmission method according to any one of any foregoing aspect or the implementations of the aspect.

DETAILED DESCRIPTION OF ILLUSTRATIVE EMBODIMENTS

The following clearly and completely describes the technical solutions in the embodiments of this application with reference to the accompanying drawings in the embodiments of this application.

Figure 1:
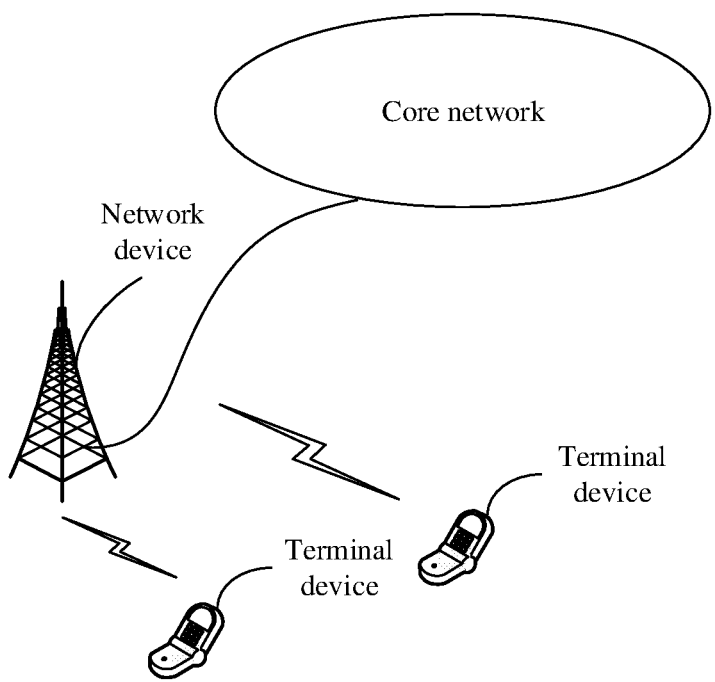
FIG. 1 is an architectural diagram of a communications system according to this application.

FIG. 1 is an architectural diagram of a communications system according to this application. An uplink control information transmission method provided in this application is applicable to the communications system shown in FIG. 1. The communications system may be an LTE communications system, or may be another communications system (for example, a 5G communications system) in the future. This is not limited herein. As shown in FIG. 1, the communications system includes a network device and a terminal device.

Communications devices in this application include the network device and the terminal device.

The network device may be a base station or an access point, or may be a device that communicates with a wireless terminal by using one or more sectors on an air interface in an access network. The base station may be configured to mutually convert a received over-the-air frame and an IP packet and serve as a router between the wireless terminal and a remaining portion of the access network, where the remaining portion of the access network may include an Internet protocol (IP) network. The base station may further coordinate attribute management of the air interface. For example, the base station may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB) in long term evolution (LTE), a relay node or an access point, a gNodeB in a future 5G network, or the like. This is not limited herein.

The terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) or a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a remote station, a remote terminal, an access terminal, a user terminal, a user agent, a user device (User Device or User Equipment). This is not limited herein.

In the uplink control information transmission method in this application, a modulation and coding scheme (MCS) offset value may be less than 1, or may be greater than 1. When a reliability requirement of transmitting UCI is less than a reliability requirement of transmitting uplink data on a resource for a PUSCH, the MCS offset value may be less than 1, or when a reliability requirement of transmitting UCI is greater than a reliability requirement of transmitting uplink data on a resource for a PUSCH, the MCS offset value may be greater than 1. The reliability requirement may be measured by using different parameters, for example, may be measured by using a transmission block error rate target (BLER Target). Specifically, when a transmission BLER target of the UCI is less than a transmission BLER target of the PUSCH, the MCS offset value is greater than 1, otherwise, the MCS offset value is less than 1.

First downlink control information (DCI) in this application may be uplink grant information, and second DCI and third DCI may be downlink grant information (DL grant).

In an implementation of the uplink control information transmission method in this application, an MCS offset value is indicated to the terminal device by using higher layer signaling and/or uplink grant information, where the MCS offset value indicated by the uplink grant information is a first MCS offset value used to multiplex and transmit, on a PUSCH, first uplink control information scheduled before the uplink grant information and/or scheduled by the uplink grant information. The terminal device maps, based on the first MCS offset value, the first uplink control information to a resource for the PUSCH, to transmit the first uplink control information.

In another implementation of the uplink control information transmission method in this application, MCS offset values are separately indicated to the terminal device by using uplink grant information and downlink grant information after the uplink grant information, where the MCS offset value indicated by the uplink grant information is a first MCS offset value used to multiplex and transmit, on a PUSCH, first uplink control information scheduled before the uplink grant information and/or scheduled by the uplink grant information, and the MCS offset value indicated by the downlink grant information after the uplink grant information is a second MCS offset value used to multiplex and transmit, on the PUSCH, second uplink control information scheduled after the uplink grant information. The terminal device separately maps, based on the MCS offset values used to multiplex and transmit the different uplink control information on the PUSCH, the first uplink control information and the second uplink control information to a resource for the PUSCH, to transmit the first uplink control information and the second uplink control information.

A specific implementation of indicating the first MCS offset value to the terminal device by using the higher layer signaling and/or the uplink grant information may be explicit or implicit indication.

A specific implementation of the explicit indication may be indicating by using the higher layer signaling and/or the uplink grant information. In an implementation, the first MCS offset value is semi-statically configured by using the higher layer signaling. In another implementation, the first MCS offset value is directly explicitly and dynamically indicated by using the uplink grant information. In still another implementation, the higher layer signaling is used to configure MCS offset value configuration information, the MCS offset value configuration information includes an MCS offset value set and a number corresponding to each MCS offset value in the set, and the uplink grant information is used to indicate a specific value number. In yet another implementation, the higher layer signaling is used to configure MCS offset value configuration information, the MCS offset value configuration information may be a table, and different UCI content and/or payload size ranges in the table correspond to different MCS offset values. In still yet another implementation, the higher layer signaling is used to configure MCS offset value configuration information, the MCS offset value configuration information may be a plurality of tables, elements in different tables may be different, different elements in a same table correspond to MCS offset values corresponding to different UCI content and/or payload size ranges, and the uplink grant information is used to indicate a number of a used table. The UCI content may be specifically any one or more of a HARQ-ACK/NACK, a scheduling request (SR), channel state information part 1 (CSI Part 1), and a CSI part 2, and a payload size of the UCI may have ranges (for example, three ranges for the HARQ-ACK/NACK: payload≤2, 2<payload≤11, and payload>11, only one range for the SR, and two ranges for the CSI part 1 or the CSI part 2: payload≤11 and payload>11). In this case, different UCI content and/or different payload size ranges correspond to different MCS offset values.

A specific implementation of the implicit indication may be, in an implementation, the first MCS offset value is indicated by using a format of the uplink grant information, and predefined information or the higher layer signaling, and a mapping relationship between the first MCS offset value and the format of the uplink grant information is statically/semi-statically configured by using the predefined information or the higher layer signaling. In another implementation, predefined information or the higher layer signaling is used to statically/semi-statically configure MCS offset value configuration information, the MCS offset value configuration information may be a plurality of tables, and a mapping relationship between different tables and different formats of the uplink grant information. Elements included in different tables may be different, and different elements in a same table correspond to MCS offset values corresponding to different UCI content and/or payload size ranges.

The format of the uplink grant information may be specifically determined based on a quantity of bits in the uplink grant information, or may be determined based on indication information of a preset bit field in the uplink grant information, or may be determined based on a type of search space that carries the uplink grant information, for example, based on whether the uplink grant information is carried in common search space (CSS) or user-specific search space (UE-specific Search Space, USS).

The format of the uplink grant information may be classified into a plurality of different formats based on a requirement. For example, the format may be classified into three formats: a compact type, a common type, and an extended type. Specifically, a bit quantity threshold range may be set, and one threshold range corresponds to one format. For another example, the format may be classified into three formats: a fallback type, a compact type, and a common type. The fallback type/the compact type is distinguished from the common type by a bit quantity, and the fallback type is distinguished from the compact type by a type of search space that carries the uplink grant information. For example, UL Grant carried on the USS is of a compact type, and UL Grant carried on the CSS is of a fallback type.

A specific implementation of indicating the second MCS offset value to the terminal device by using the higher layer signaling and/or the downlink grant information may be explicit or implicit indication.

A specific implementation of the explicit indication may be indicating by using the higher layer signaling and/or the downlink grant information. In an implementation, the second MCS offset value is semi-statically indicated by using the higher layer signaling. In another implementation, the second MCS offset value is directly explicitly and dynamically indicated by using the downlink grant information. In still another implementation, the higher layer signaling is used to configure MCS offset value configuration information, the MCS offset value configuration information includes an MCS offset value set and a number corresponding to each MCS offset value in the set, and the downlink grant information is used to indicate a specific value number. In yet another implementation, the higher layer signaling is used to configure MCS offset value configuration information, the MCS offset value configuration information may be a plurality of tables, elements in different tables may be different, different elements in a same table correspond to MCS offset values corresponding to different UCI content and/or payload size ranges, and the downlink grant information is used to indicate a number of a used table. The UCI content may be specifically one of a HARQ-ACK/NACK, an SR, a CSI part 1, and a CSI part 2, and a payload size of the UCI may have ranges (for example, two ranges for the HARQ-ACK/NACK: payload≤2 and payload>2, only one range for the SR, and three ranges for the CSI part 1 or the CSI part 2: payload≤2, 3<payload≤11, and payload>11). In this case, different UCI content and/or different payload size ranges correspond to different MCS offset values.

A specific implementation of the implicit indication may be, in an implementation, the second MCS offset value is indicated by using a format of the downlink grant information, and predefined information or the higher layer signaling, and a mapping relationship between the second MCS offset value and the format of the downlink grant information is statically/semi-statically configured by using the predefined information or the higher layer signaling. In another implementation, the second MCS offset value is indicated by using a receiving time difference between the downlink grant information and the uplink grant information, and predefined information or the higher layer signaling, and a mapping relationship between the second MCS offset value and the time difference is statically/semi-statically configured by using the predefined information or the higher layer signaling. In still another implementation, predefined information or the higher layer signaling is used to statically/semi-statically configure MCS offset value configuration information, the MCS offset value configuration information may be a plurality of tables, and a mapping relationship between different tables and different formats of the downlink grant information. Elements in different tables may be different, and different elements in a same table correspond to MCS offset values corresponding to different UCI content and/or payload size ranges. In yet another implementation, predefined information or the higher layer signaling is used to statically/semi-statically configure MCS offset value configuration information, the MCS offset value configuration information may be a plurality of tables, and a mapping relationship between different tables and receiving time differences between different downlink grant information and the uplink grant information. Elements in different tables may be different, and different elements in a same table correspond to MCS offset value sets corresponding to different UCI content and/or payload size ranges.

The format of the downlink grant information may be specifically determined based on a quantity of bits in the downlink grant information, or may be determined based on indication information of a preset bit field in the downlink grant information, or may be determined based on a type of search space that carries the downlink grant information, for example, based on whether the downlink grant information is carried in common search space (CSS) or user-specific search space (USS).

The format of the downlink grant information may be classified into a plurality of different formats based on a requirement. For example, the format may be classified into three formats: a compact type, a common type, and an extended type. Specifically, a bit quantity threshold range may be set, and one threshold range corresponds to one format. For another example, the format may be classified into three formats: a fallback type, a compact type, and a common type. The fallback type/the compact type is distinguished from the common type by a bit quantity, and the fallback type is distinguished from the compact type by a location of the DL Grant. For example, DL Grant carried on the USS is of a compact type, and DL Grant carried on the CSS is of a fallback type.

It should be noted that the mapping relationship that is between the second MCS offset value and the format of the downlink grant information and that is statically/semi-statically configured by using the predefined information or the higher layer signaling may be the same as or different from the mapping relationship that is between the first MCS offset value and the format of the uplink grant information and that is statically/semi-statically configured by using the predefined information or the higher layer signaling, the format of the downlink grant information may be the same as or different from the format of the uplink grant information. This may be flexibly set based on a requirement.

Figure 2:
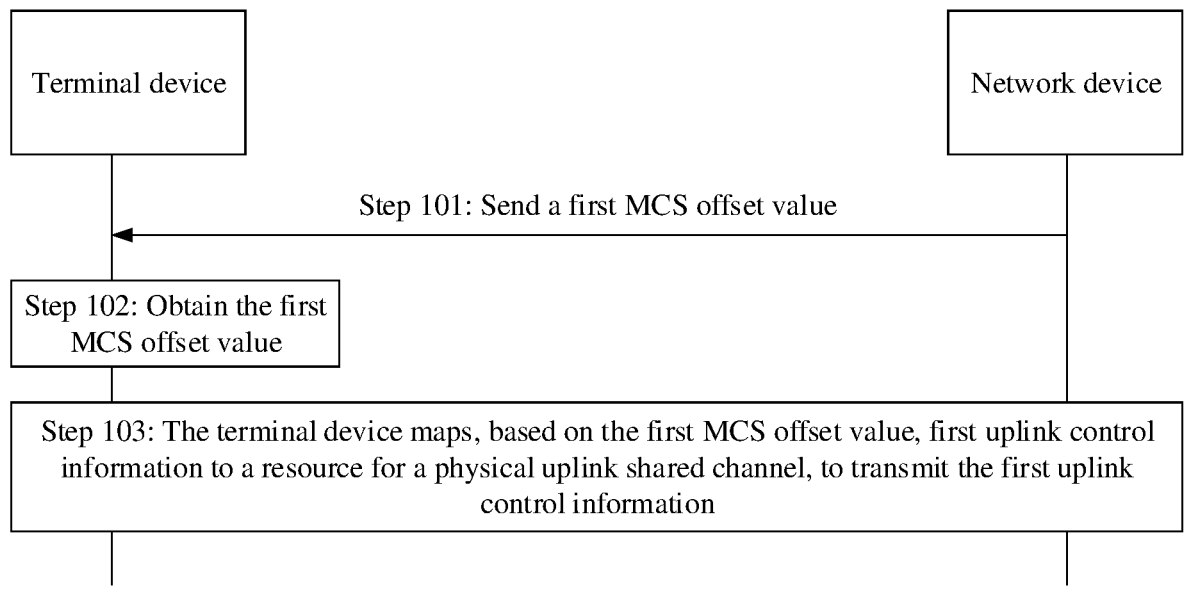
FIG. 2 is a flowchart of an uplink control information transmission method according to this application.

FIG. 2 is a flowchart of an uplink control information transmission method according to this application. As shown in FIG. 2, the method in this embodiment may include the following steps.

Step 101: A network device sends a first MCS offset value.

The first MCS offset value is less than 1.

Specifically, the network device may indicate the first MCS offset value to a terminal device by using higher layer signaling and/or first downlink control information (for example, uplink grant information). A specific implementation may be the foregoing explicit or implicit indication. For details about the implementation, refer to the foregoing explanations and descriptions. Details are not described herein again.

Step 102: The terminal device obtains the first MCS offset value.

The terminal device obtains the first MCS offset value based on the higher layer signaling and/or the first downlink control information sent by the network device in step 101.

When the network device explicitly indicates the first MCS offset value by using the higher layer signaling and/or the first downlink control information, the terminal device obtains the first MCS offset value. When the network device implicitly indicates the first MCS offset value by using the higher layer signaling and/or the first downlink control information, the terminal device obtains the first MCS offset value based on a format of the first downlink control information.

Step 103: The terminal device maps, based on the first MCS offset value, first uplink control information to a resource for a physical uplink shared channel, to transmit the first uplink control information.

Correspondingly, the network device receives the first uplink control information on the physical uplink shared channel based on the first MCS offset value.

Optionally, an implementation of the foregoing step 101 is that the network device sends the first downlink control information, where the first downlink control information is used to schedule the physical uplink shared channel and/or the first uplink control information, and the format of the first downlink control information is used to indicate the first MCS offset value. Correspondingly, an implementation of step 102 is that the terminal device receives the first downlink control information, where the first downlink control information is used to schedule the physical uplink shared channel and/or the first uplink control information, and the resource for the physical uplink shared channel and an uplink control channel resource that carries the first uplink control information overlap in time domain, and the terminal device determines the first MCS offset value based on the format of first downlink control information.

That the resource for the physical uplink shared channel and the uplink control channel resource that carries the first uplink control information overlap in time domain specifically means that the resource for the physical uplink shared channel and the uplink control channel resource that carries the first uplink control information partially or completely overlap in time domain. Partial overlapping is used as an example. The resource for the physical uplink shared channel occupies symbols 1 to 10 in a slot, and the uplink control channel resource that carries the first uplink control information occupies symbols 9 to 13 in the slot.

Optionally, the terminal device may determine the format of the first downlink control information based on a quantity of bits in the first downlink control information, indication information of at least one preset bit field in the first downlink control information, or a type of search space that carries the first downlink control information.

An implementation in which the terminal device determines the first MCS offset value based on the format of the first downlink control information is, when the first downlink control information is compact downlink control information, the terminal device determines that the first modulation and coding scheme offset value is a first preset value, where the first preset value is a value configured by using higher layer signaling or a predefined value.

Optionally, another implementation of the foregoing step 101 is that the network device sends the higher layer signaling, where the higher layer signaling is used to indicate configuration information for a modulation and coding scheme offset value used to multiplex uplink control information on a physical uplink shared channel, and the network device sends the first downlink control information, where the first downlink control information is used to schedule the physical uplink shared channel and/or the first uplink control information, and the format of the first downlink control information is used to indicate the first MCS offset value. Correspondingly, another implementation of step 102 is that the terminal device receives the higher layer signaling, where the higher layer signaling is used to indicate the configuration information for a modulation and coding scheme offset value used to multiplex uplink control information on a physical uplink shared channel, the terminal device receives the first downlink control information, where the first downlink control information is used to schedule the physical uplink shared channel and/or the first uplink control information, and the resource for the physical uplink shared channel and an uplink control channel resource that carries the first uplink control information overlap in time domain, the terminal device determines at least one of a type and a payload size of the first uplink control information, and the terminal device determines the first MCS offset value based on the configuration information for a modulation and coding scheme offset value, the at least one of the type and the payload size of the first uplink control information, and/or the format of the first downlink control information.

In this embodiment, the network device sends the first MCS offset value to the terminal device, and the terminal device maps, based on the first MCS offset value, the first uplink control information to the resource for the physical uplink shared channel, to transmit the first uplink control information, where the first MCS offset value is less than 1. The terminal device allocates, based on the first MCS offset value, proper transmission resources to the first uplink control information and uplink data that is of the physical uplink shared channel, to balance transmission reliability requirements of the first uplink control information and the uplink data. The first MCS offset value is less than 1, so that the terminal device can allocate more resources to the uplink data of the physical uplink shared channel. This improves transmission reliability of the uplink data, to meet a requirement of the terminal device on a service, for example, a URLLC service.

The following specifically explains and describes, by using a specific embodiment, the uplink control information transmission method of this application shown in FIG. 2.

Figure 3:
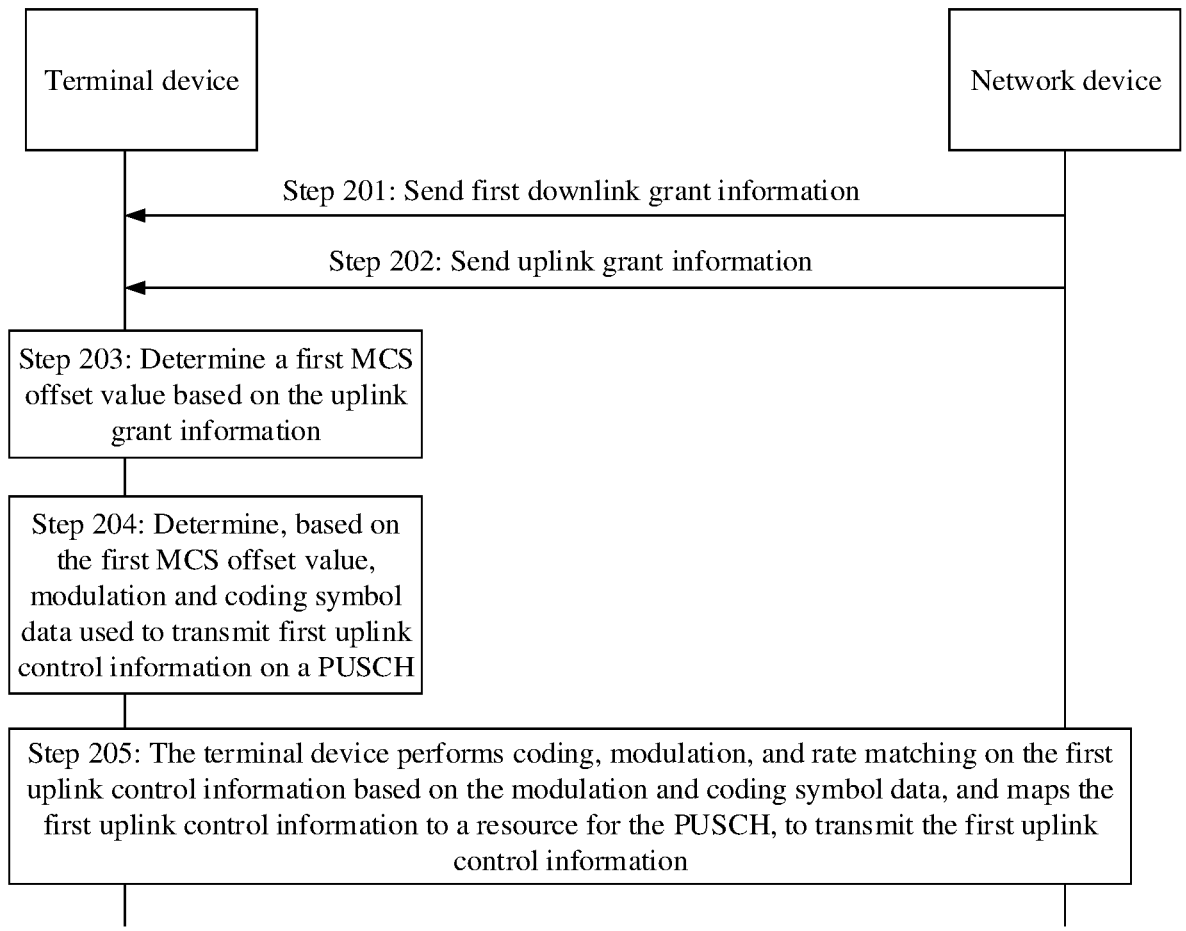
FIG. 3 is a flowchart of another uplink control information transmission method according to this application.
Figure 4:
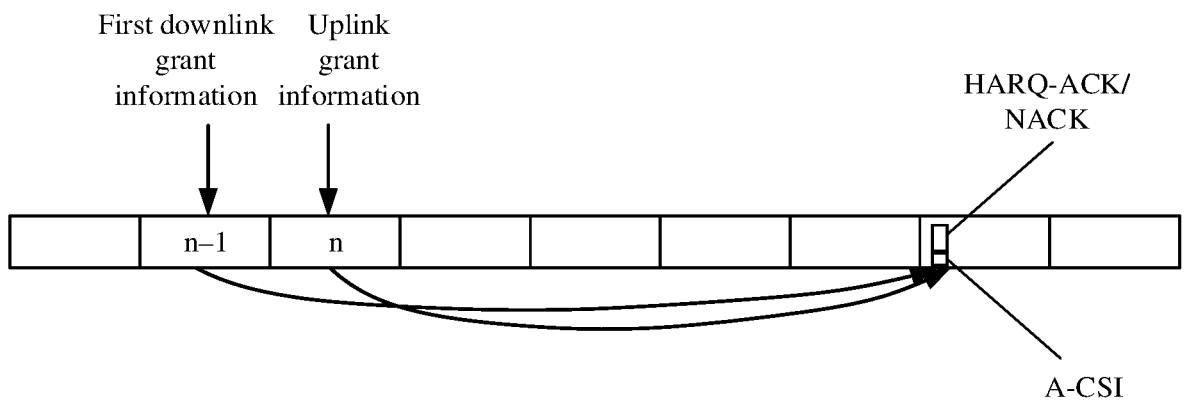
FIG. 4 is a schematic diagram of a transmission resource in the uplink control information transmission method shown in FIG. 3.

FIG. 3 is a flowchart of another uplink control information transmission method according to this application. FIG. 4 is a schematic diagram of a transmission resource in the uplink control information transmission method shown in FIG. 3. This embodiment is described by using an example in which first downlink control information is uplink grant information. As shown in FIG. 3, the method in this embodiment may include the following steps.

Step 201: A network device sends first downlink grant information to a terminal device.

The terminal device receives the first downlink grant information sent by the network device.

The first downlink grant information is used to perform at least one of scheduling the terminal device to receive downlink data through a PDSCH and feed back a corresponding hybrid automatic repeat request response-acknowledgement/negative acknowledgement and scheduling the terminal device to report A-CSI. The first downlink grant information further carries parameters K0 and K1, where the parameter K0 is used to indicate a transmission latency of the PDSCH, and the parameter K1 is used to indicate a feedback latency of the hybrid automatic repeat request response-acknowledgement/negative acknowledgement.

This embodiment of this application is described by using an example in which the network device sends the first downlink grant information to the terminal device in a slot n−1, the first downlink grant information is used to schedule the terminal device to receive the downlink data through the PDSCH and feed back the corresponding hybrid automatic repeat request response-acknowledgement/negative acknowledgement, K0=0, and K1=6. As shown in FIG. 4, the terminal device receives, in the slot n−1, the first downlink grant information sent by the network device, and receives the downlink data through the PDSCH in the slot n−1. Because K1=6, the terminal device learns that the hybrid automatic repeat request response-acknowledgement/negative acknowledgement corresponding to the PDSCH in the slot n−1 needs to be fed back to the network device in a slot n+5.

Step 202: The network device sends uplink grant information to the terminal device.

The terminal device receives the uplink grant information sent by the network device.

The uplink grant information is used to perform at least one scheduling the terminal device to send uplink data through a PUSCH, scheduling the terminal device to report A-CSI, and scheduling the terminal device to send other information that needs to be multiplexed and transmitted on the PUSCH. The uplink grant information carries a parameter K2, and the parameter K2 is used to indicate a transmission latency of the PUSCH.

This embodiment of this application is described by using an example in which the network device sends the uplink grant information to the terminal device in a slot n, the uplink grant information is used to schedule the terminal device to send the uplink data through the PUSCH and schedule the terminal device to report the A-CSI, and K2=5. As shown in FIG. 4, the terminal device receives, in the slot n, the uplink grant information sent by the network device. Because K2=5, the terminal device learns that the uplink data is to be sent through the PUSCH in the slot n+5, and the A-CSI is to be reported in the slot n+5.

Step 203: The terminal device determines, based on the uplink grant information, a first MCS offset value used to multiplex and transmit first uplink control information UCI 1 on the PUSCH.

The examples in the foregoing steps are further described by using an example. Two pieces of first uplink control information UCI 1 are included in this embodiment. One piece is a hybrid automatic repeat request response-acknowledgement/negative acknowledgement, and the other piece is the A-CSI. The hybrid automatic repeat request response-acknowledgement/negative acknowledgement is a hybrid automatic repeat request response-acknowledgement/negative acknowledgement corresponding to a PDSCH scheduled before the uplink grant information. In this embodiment, the hybrid automatic repeat request response-acknowledgement/negative acknowledgement may be the hybrid automatic repeat request response-acknowledgement/negative acknowledgement message corresponding to the PDSCH in step 201.

It should be noted that the terminal device may separately determine, based on the uplink grant information, a first MCS offset value used to multiplex and transmit the hybrid automatic repeat request response-acknowledgement/negative acknowledgement on the PUSCH, and a first MCS offset value used to multiplex and transmit the A-CSI on the PUSCH. The first MCS offset values of the HARQ-ACK/NACK and the A-CSI may be the same or may be different.

It can be learned that the terminal device may determine one or more first MCS offset values based on content invoked by the uplink grant information.

The uplink grant information sent by the network device may explicitly or implicitly indicate the first MCS offset value to the terminal device, so that the terminal device can determine the first MCS offset value based on the uplink grant information. For a specific implementation of the explicit or implicit indication, refer to the foregoing descriptions. Details are not described herein again.

Step 204: The terminal device determines, based on the first MCS offset value, modulation and coding symbol data Q1 used to transmit the first uplink control information UCI 1 on the PUSCH.

The example descriptions in the foregoing steps are further described by using an example. Because the hybrid automatic repeat request response-acknowledgement/negative acknowledgement and the A-CSI need to be transmitted in the slot n+5, that is, need to be multiplexed onto the PUSCH, the terminal device needs to determine, based on the first MCS offset value used to multiplex and transmit the hybrid automatic repeat request response-acknowledgement/negative acknowledgement on the PUSCH, modulation and coding symbol data Q11 used to transmit the hybrid automatic repeat request response-acknowledgement/negative acknowledgement on the PUSCH, and determine, based on the first MCS offset value used to multiplex and transmit the A-CSI on the PUSCH, modulation and coding symbol data Q12 used to transmit the A-CSI on the PUSCH. That is, Q1 includes Q11 and Q12.

It can be learned that the terminal device may determine one or more pieces of modulation and coding symbol data based on one or more first MCS offset values.

Step 205: The terminal device performs coding, modulation, and rate matching on the first uplink control information UCI 1 based on the modulation and coding symbol data Q1, and maps the first uplink control information UCI 1 to a resource for the PUSCH, to transmit the first uplink control information UCI 1.

Specifically, the example descriptions in the foregoing steps are further described by using an example. As shown in FIG. 4, the terminal device sends the uplink data, the hybrid automatic repeat request response-acknowledgement/negative acknowledgement, and the A-CSI to the network device in the slot n+5. To be specific, the hybrid automatic repeat request response-acknowledgement/negative acknowledgement and the A-CSI are separately mapped to the resource for the PUSCH, to transmit the HARQ-ACK/NACK and the A-CSI. The HARQ-ACK/NACK and the A-CSI may be mapped to consecutive resource elements in the resource for the PUSCH, or may be mapped to nonconsecutive resource elements in the resource for the PUSCH, to transmit the HARQ-ACK/NACK and the A-CSI.

In this embodiment, the first MCS offset value may be greater than 1 or may be less than 1.

In this embodiment, the network device sends the uplink grant information to the terminal device, and the terminal device determines, based on the uplink grant information, the first MCS offset value used to multiplex and transmit the first uplink control information UCI 1 on the PUSCH, and maps, based on the first MCS offset value, the first uplink control information to the resource for the physical uplink shared channel, to transmit the first uplink control information. The terminal device allocates, based on the first MCS offset value, proper transmission resources to the first uplink control information and the uplink data that is of the physical uplink shared channel, to balance a difference between transmission reliability requirements of the first uplink control information and the uplink data. If the first MCS offset value is less than 1, the terminal device can allocate more resources to the uplink data of the physical uplink shared channel. This improves transmission reliability of the uplink data, to meet a requirement of the terminal device on a service, for example, a URLLC service. If the first MCS offset value is greater than 1, the terminal device can allocate more resources to the first uplink control information. This improves transmission reliability of the first uplink control information, to meet a requirement of the terminal device on a service.

In addition, in this embodiment, a plurality of pieces of first uplink control information may be separately mapped to the physical uplink shared channel for transmission, to meet different requirements on the service.

Figure 5:
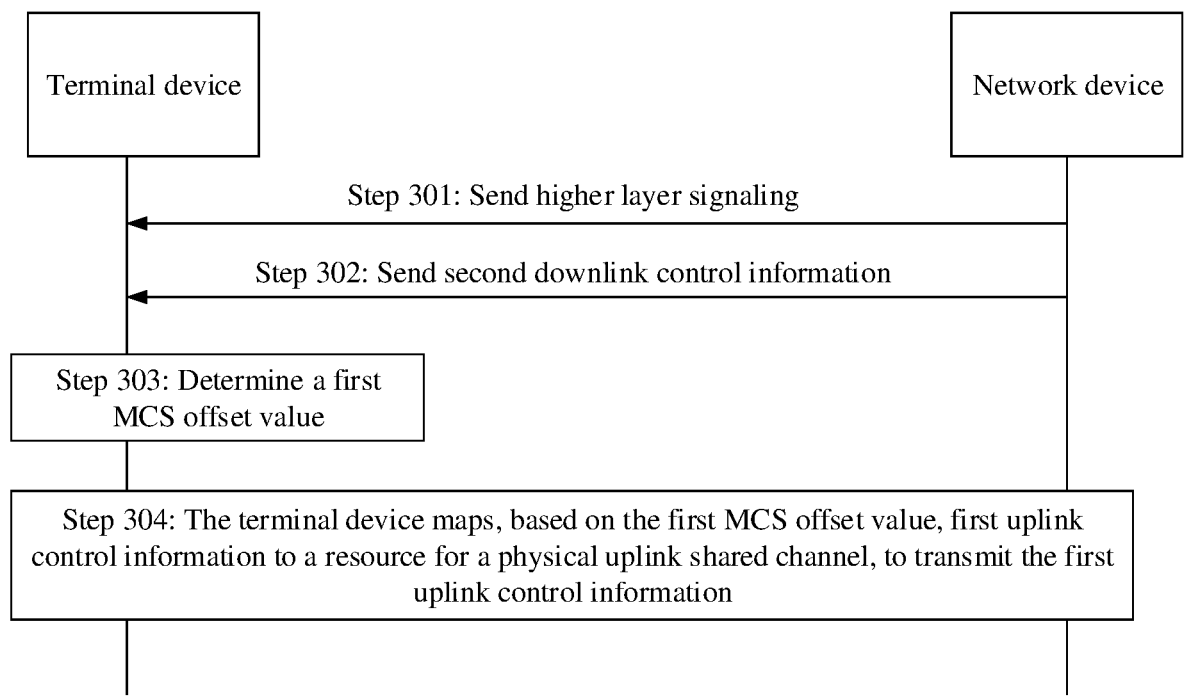
FIG. 5 is a flowchart of another uplink control information transmission method according to this application.

FIG. 5 is a flowchart of another uplink control information transmission method according to this application. A difference between this embodiment and the foregoing embodiments lies in that this embodiment is grant free PUSCH transmission. As shown in FIG. 5, the method in this embodiment may include the following steps.

Step 301: A network device sends higher layer signaling.

The higher layer signaling is used to indicate configuration information for a modulation and coding scheme offset value used to multiplex and transmit uplink control information on a grant-free physical uplink shared channel.

Correspondingly, the terminal device receives the higher layer signaling.

Step 302: The network device sends second downlink control information.

The second downlink control information is used to schedule first uplink control information, and a format of the second downlink control information is used to instruct the terminal device to determine a first modulation and coding scheme offset value based on the configuration information for a modulation and coding scheme offset value and/or the format of the second downlink control information.

Correspondingly, the terminal device receives the second downlink control information. The second downlink control information is used to schedule the first uplink control information, and an uplink control channel resource that carries the first uplink control information and a resource for the grant-free physical uplink shared channel overlap in time domain.

The second downlink control information in this embodiment may be specifically downlink grant information.

Step 303: The terminal device determines the first MCS offset value based on the configuration information for a modulation and coding scheme offset value and/or the format of the second downlink control information.

Specifically, in an implementation, the terminal device determines the first MCS offset value based on the configuration information for a modulation and coding scheme offset value. In another implementation, the terminal device determines the first MCS offset value based on the format of the second downlink control information. In an implementation, the terminal device determines the first MCS offset value based on the configuration information for a modulation and coding scheme offset value and the format of the second downlink control information.

Optionally, the terminal device may determine the format of the second downlink control information based on a quantity of bits in the second downlink control information, indication information of at least one preset bit field in the second downlink control information, or a type of search space that carries the second downlink control information.

An implementation in which the terminal device determines the first MCS offset value based on the format of the second downlink control information is, when the second downlink control information is compact downlink control information, the terminal device determines that the first modulation and coding scheme offset value is a first preset value, where the first preset value is a value configured by using higher layer signaling or a predefined value.

Optionally, a specific implementation of determining the first modulation and coding scheme offset value based on the configuration information for a modulation and coding scheme offset value and the format of the second downlink control information may be that the terminal device determines at least one a type and a payload size of the first uplink control information, and the terminal device determines the first modulation and coding scheme offset value based on the configuration information for a modulation and coding scheme offset value used to multiplex uplink control information on a physical uplink shared channel, the at least one of the type and the payload size of the first uplink control information, and the format of the second downlink control information.

Optionally, a specific implementation in which the terminal device determines the first MCS offset value based on the configuration information for a modulation and coding scheme offset value may be that the terminal device determines at least one a type and a payload size of the first uplink control information, and the terminal device determines the first modulation and coding scheme offset value based on the configuration information for a modulation and coding scheme offset value and the at least one of the type and the payload size of the first uplink control information.

Specifically, the terminal device may determine the first modulation and coding scheme offset value based on the configuration information for a modulation and coding scheme offset value and the type and the payload size of the first uplink control information, the terminal device may determine the first modulation and coding scheme offset value based on the configuration information for a modulation and coding scheme offset value, the type and the payload size of the first uplink control information, and indication of the second downlink control information, or the terminal device may determine the first modulation and coding scheme offset value based on the configuration information for a modulation and coding scheme offset value, the type and the payload size of the first uplink control information, and the format of the second downlink control information.

Step 304: The terminal device maps, based on the first MCS offset value, the first uplink control information to the resource for the physical uplink shared channel, to transmit the first uplink control information.

Correspondingly, the network device receives the first uplink control information on the physical uplink shared channel based on the first MCS offset value.

In this embodiment, the physical uplink shared channel does not need to be scheduled by using uplink grant information, and may be triggered by the terminal device based on a requirement of the terminal device on a service.

It should be noted that the configuration information for a modulation and coding scheme offset value in step 301 may not be indicated by using the higher layer signaling. In another implementation, the configuration information for a modulation and coding scheme offset value may be pre-defined information.

In this embodiment, the network device sends the second downlink control information to the terminal device, and the terminal device determines the first MCS offset value based on the configuration information for a modulation and coding scheme offset value and/or the format of the second downlink control information, and maps, based on the first MCS offset value, the first uplink control information to the resource for the physical uplink shared channel, to transmit the first uplink control information. The terminal device allocates, based on the first MCS offset value, proper transmission resources to the first uplink control information and uplink data that is of the physical uplink shared channel, to balance a difference between transmission reliability requirements of the first uplink control information and the uplink data. If the first MCS offset value is less than 1, the terminal device can allocate more resources to the uplink data of the physical uplink shared channel. This improves transmission reliability of the uplink data, to meet a requirement of the terminal device on a service, for example, a URLLC service. If the first MCS offset value is greater than 1, the terminal device can allocate more resources to the first uplink control information. This improves transmission reliability of the first uplink control information, to meet a requirement of the terminal device on a service.

The following specifically explains and describes, by using a specific embodiment, the uplink control information transmission method of this application shown in FIG. 5.

Figure 6:
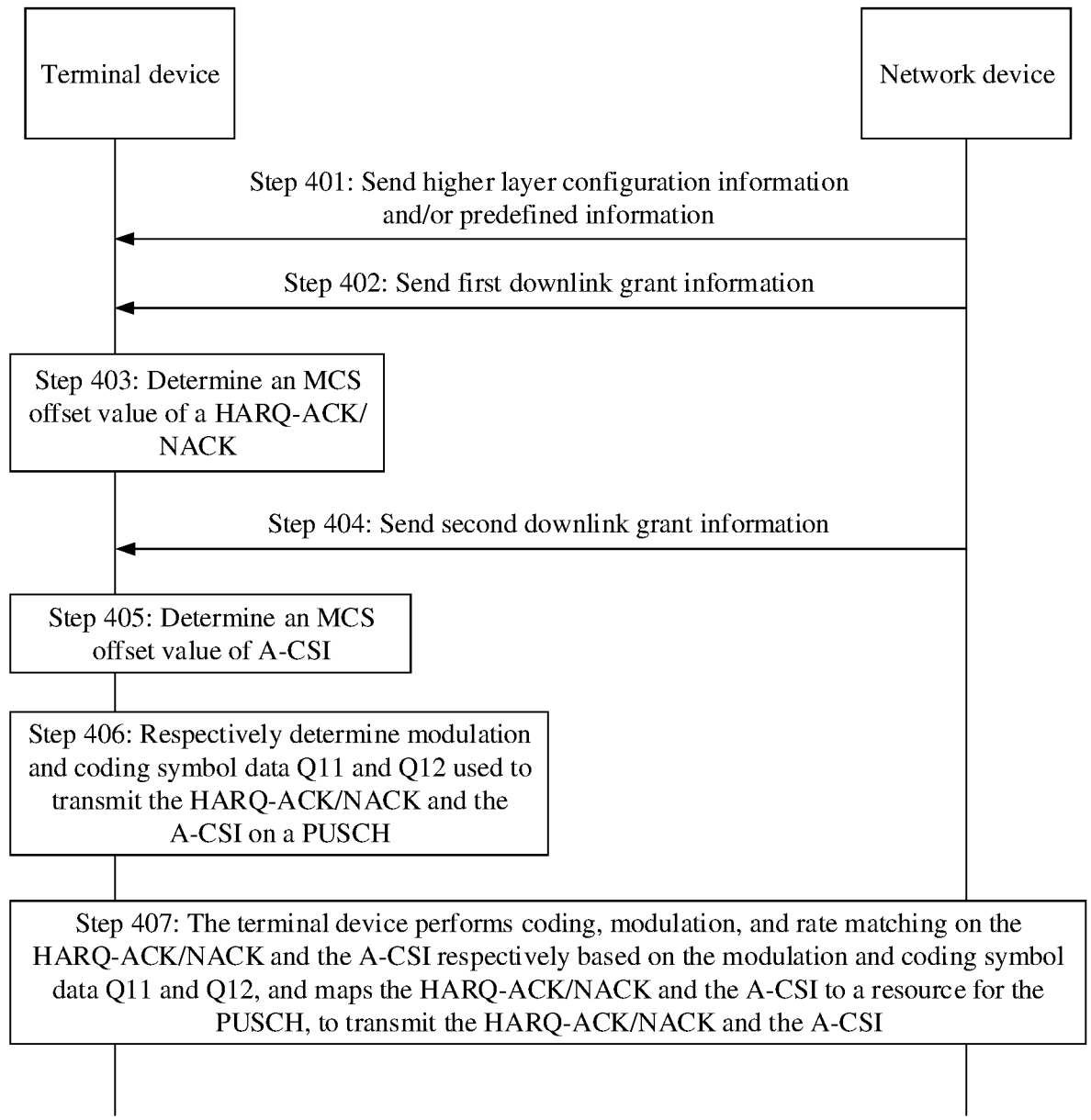
FIG. 6 is a flowchart of another uplink control information transmission method according to this application.
Figure 7:
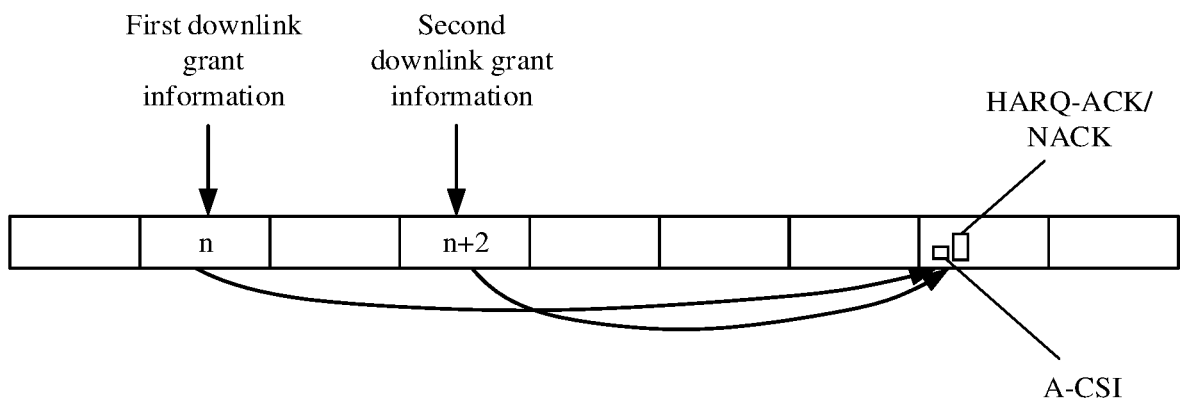
FIG. 7 is a schematic diagram of a transmission resource in the uplink control information transmission method shown in FIG. 6.

FIG. 6 is a flowchart of another uplink control information transmission method according to this application. FIG. 7 is a schematic diagram of a transmission resource in the uplink control information transmission method shown in FIG. 6. This embodiment is described by using an example in which second downlink control information is first downlink grant information. As shown in FIG. 6, the method in this embodiment may include the following steps.

Step 401: A terminal device receives higher layer configuration information and/or predefined information sent by a network device.

The higher layer configuration information and/or predefined information carries grant free transmission configuration information, and the grant free transmission configuration information includes a transmission period, an offset value, a time-frequency resource, MCS offset value configuration information used to multiplex and transmit UCI on a grant-free resource, and the like.

Step 402: The network device sends first downlink grant information to the terminal device.

The terminal device receives the first downlink grant information sent by the network device.

The first downlink grant information is used to perform at least one of scheduling the terminal device to receive downlink data through a PDSCH and feed back a corresponding hybrid automatic repeat request response-acknowledgement/negative acknowledgement and scheduling the terminal device to report A-CSI. The first downlink grant information further carries parameters K0 and K1, where the parameter K0 is used to indicate a transmission latency of the PDSCH, and the parameter K1 is used to indicate a feedback latency of the hybrid automatic repeat request response-acknowledgement/negative acknowledgement.

This embodiment of this application is described by using an example in which the network device sends the first downlink grant information to the terminal device in a slot n, the first downlink grant information is used to schedule the terminal device to receive the downlink data through the PDSCH and feed back the corresponding hybrid automatic repeat request response-acknowledgement/negative acknowledgement, K0=0, and K1=6. As shown in FIG. 7, the terminal device receives, in the slot n, the first downlink grant information sent by the network device, and receives the downlink data through the PDSCH in the slot n. Because K1=6, the terminal device learns that the hybrid automatic repeat request response-acknowledgement/negative acknowledgement corresponding to the PDSCH in the slot n needs to be fed back to the network device in a slot n+6.

Step 403: The terminal device determines an MCS offset value of the hybrid automatic repeat request response-acknowledgement/negative acknowledgement based on the first downlink grant information.

The first downlink grant information sent by the network device may explicitly or implicitly indicate the MCS offset value of the hybrid automatic repeat request response-acknowledgement/negative acknowledgement to the terminal device, so that the terminal device can determine the MCS offset value of the hybrid automatic repeat request response-acknowledgement/negative acknowledgement based on the first downlink grant information.

Step 404: The network device sends second downlink grant information to the terminal device.

The terminal device receives the second downlink grant information sent by the network device.

This embodiment of this application is described by using an example in which the network device sends the second downlink grant information to the terminal device in a slot n+2, the second downlink grant information is used to schedule the terminal device to report A-CSI, and K1 in the second downlink grant information is 4. As shown in FIG. 7, the terminal device receives, in the slot n+2, the second downlink grant information sent by the network device, and the second downlink grant information is used to schedule the terminal device to report the A-CSI. Because K1=4, the terminal device learns that the A-CSI needs to be fed back to the network device in a slot n+6.

Step 405: The terminal device determines an MCS offset value of the A-CSI based on the second downlink grant information.

The second downlink grant information sent by the network device may explicitly or implicitly indicate the MCS offset value of the A-CSI to the terminal device, so that the terminal device can determine the MCS offset value of the A-CSI based on the second downlink grant information.

Step 406: The terminal device respectively determines, based on the MCS offset value of the hybrid automatic repeat request response-acknowledgement/negative acknowledgement and the MCS offset value of the A-CSI, modulation and coding symbol data Q11 and Q12 used to transmit the hybrid automatic repeat request response-acknowledgement/negative acknowledgement and the A-CSI on a PUSCH.

The example descriptions in the foregoing steps are further described by using an example. Because the uplink control information needs to be transmitted in the slot n+6, when the terminal device determines that uplink data needs to be sent to the network device through the PUSCH in the slot n+6, the terminal device may determine that the uplink control information needs to be multiplexed on the PUSCH. Therefore, the terminal device needs to respectively determine, based on the MCS offset value of the hybrid automatic repeat request response-acknowledgement/negative acknowledgement and the MCS offset value of the A-CSI, the modulation and coding symbol data Q11 and Q12 used to transmit the hybrid automatic repeat request response-acknowledgement/negative acknowledgement and the A-CSI on the PUSCH.

Step 407: The terminal device performs coding, modulation, and rate matching on the hybrid automatic repeat request response-acknowledgement/negative acknowledgement and the A-CSI respectively based on the modulation and coding symbol data Q11 and Q12, and maps the hybrid automatic repeat request response-acknowledgement/negative acknowledgement and the A-CSI to a resource for the PUSCH, to transmit the hybrid automatic repeat request response-acknowledgement/negative acknowledgement and the A-CSI.

Specifically, as shown in FIG. 7, the terminal device sends the uplink data, the hybrid automatic repeat request response-acknowledgement/negative acknowledgement, and the A-CSI to the network device through the PUSCH in the slot n+6.

In this embodiment, the network device sends the first downlink grant information and the second downlink grant information to the terminal device on different time resources, and the terminal device determines, based on the first downlink grant information, an MCS offset value of information scheduled by using the first downlink grant information, and determines, based on the second downlink grant information, an MCS offset value of information scheduled by using the second downlink grant information. The physical uplink shared channel resource of the terminal device and an uplink control channel resource that carries the information scheduled by using the first downlink grant information and the information scheduled by using the second downlink grant information overlap in time domain. The terminal device respectively determines, based on the MCS offset value of the information scheduled by using the first downlink grant information and the MCS offset value of the information scheduled by using the second downlink grant information, modulation and coding symbol data used to transmit, on the PUSCH, the information scheduled by using the first downlink grant information and the second downlink grant information, and maps, based on the modulation and coding symbol data, the information to the resource for the PUSCH, to transmit the information, to meet a requirement of the terminal device on a service.

Figure 8:
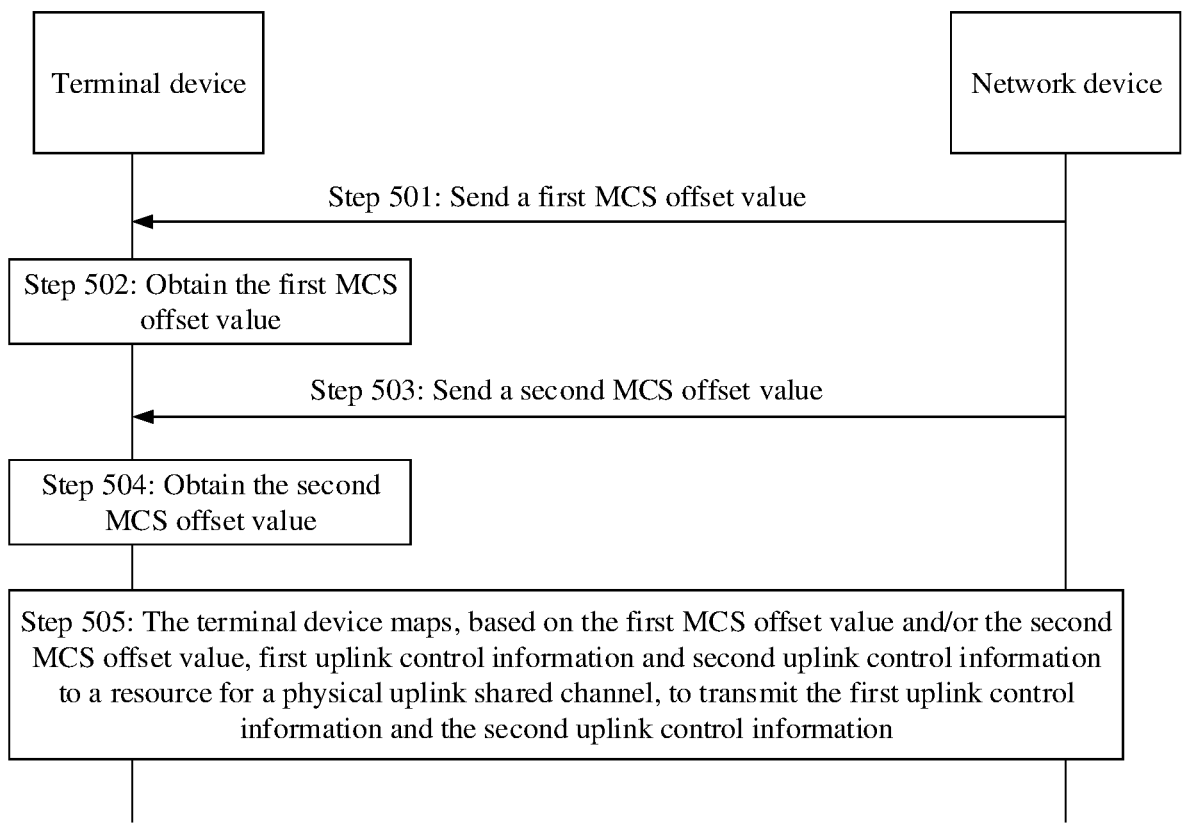
FIG. 8 is a flowchart of another uplink control information transmission method according to this application.

FIG. 8 is a flowchart of another uplink control information transmission method according to this application. A difference between this embodiment and the foregoing embodiments lies in that in this embodiment, after the embodiment shown in FIG. 2, a terminal device further obtains a second MCS offset value. As shown in FIG. 8 the method in this embodiment may include the following steps.

Step 501: A network device sends a first MCS offset value.

Step 502: The terminal device obtains the first MCS offset value.

For specific descriptions of step 501 and step 502, refer to step 101 and step 102 in the embodiment shown in FIG. 2. Details are not described herein again.

Step 503: The network device sends a second MCS offset value.

The second modulation and coding scheme offset value is greater than or equal to 1, or the second modulation and coding scheme offset value is less than 1.

Specifically, the network device may indicate the second MCS offset value to the terminal device by using higher layer signaling and/or third downlink control information (for example, downlink grant information). A specific implementation may be the foregoing explicit or implicit indication. For details about the implementation, refer to the foregoing explanations and descriptions. Details are not described herein again.

Step 504: The terminal device obtains the second MCS offset value.

The terminal device obtains the second MCS offset value based on the higher layer signaling and/or the third downlink control information sent by the network device in step 503.

When the network device explicitly indicates the second MCS offset value by using the higher layer signaling and/or the third downlink control information, the terminal device obtains the second MCS offset value. When the network device implicitly indicates the second MCS offset value by using the higher layer signaling and/or the third downlink control information, the terminal device obtains the second MCS offset value based on a format of the third downlink control information.

Step 505: The terminal device maps, based on the first MCS offset value and/or the second MCS offset value, first uplink control information and second uplink control information to a resource for a physical uplink shared channel, to transmit the first uplink control information and the second uplink control information.

Correspondingly, the network device receives the first uplink control information and the second uplink control information on the physical uplink shared channel based on the first MCS offset value and/or the second MCS offset value.

There may be one or more pieces of third downlink control information. Correspondingly, there may be one or more second MCS offset values.

Optionally, a specific implementation of step 504 may be that the terminal device receives the higher layer signaling, where the higher layer signaling is used to indicate the second modulation and coding scheme offset value used to multiplex the second uplink control information on the physical uplink shared channel, and obtains, based on the higher layer signaling, the second modulation and coding scheme offset value used to multiplex the second uplink control information on the physical uplink shared channel. Alternatively, the terminal device receives at least one piece of third downlink control information, where the at least one piece of third downlink control information is used to schedule a physical downlink shared channel and the second uplink control information, and the resource for the physical uplink shared channel and an uplink control channel resource that carries the second uplink control information overlap in time domain, and obtains, based on the at least one piece of third downlink control information, the second modulation and coding scheme offset value used to multiplex the second uplink control information on the physical uplink shared channel.

Optionally, a specific implementation of obtaining, based on the at least one piece of third downlink control information, the second modulation and coding scheme offset value used to multiplex the second uplink control information on the physical uplink shared channel may be determining the second modulation and coding scheme offset value based on a format of the at least one piece of third downlink control information.

Optionally, the terminal device may determine the format of the third downlink control information based on a quantity of bits in the third downlink control information, indication information of at least one preset bit field in the third downlink control information, or a type of search space that carries the third downlink control information.

Optionally, a specific implementation of obtaining, based on the at least one piece of third downlink control information, the second modulation and coding scheme offset value used to multiplex the second uplink control information on the physical uplink shared channel may be respectively obtaining a receiving time difference between the first downlink control information and the at least one piece of third downlink control information, and determining the second modulation and coding scheme offset value based on the receiving time difference between the first downlink control information and the at least one piece of third downlink control information.

In the foregoing process of determining the second modulation and coding scheme offset value, when the at least one piece of third downlink control information is a plurality of pieces of third downlink control information, a modulation and coding scheme offset value corresponding to each piece of third downlink control information may be determined, and the terminal device determines the second modulation and coding scheme offset value based on one or more of modulation and coding scheme offset values corresponding to the plurality of pieces of third downlink control information.

In this embodiment, the network device indicates the first MCS offset value and the second MCS offset value to the terminal device, and the terminal device maps, based on the first MCS offset value and/or the second MCS offset value, the first uplink control information and the second uplink control information to the resource for the physical uplink shared channel, to transmit the first uplink control information and the second uplink control information. The terminal device allocates, based on the first MCS offset value and the second MCS offset value, proper transmission resources to the first uplink control information, the second uplink control information, and uplink data that is of the physical uplink shared channel, to balance a difference between transmission reliability requirements of the first uplink control information, the second uplink control information, and the uplink data, to match fluctuation of reliability requirements of transmission of a plurality of services and transmission of a plurality of pieces of uplink control information, so as to meet a requirement of the terminal device on a service.

The following specifically explains and describes, by using two specific embodiments, the uplink control information transmission method of this application shown in FIG. 8.

Figure 9:
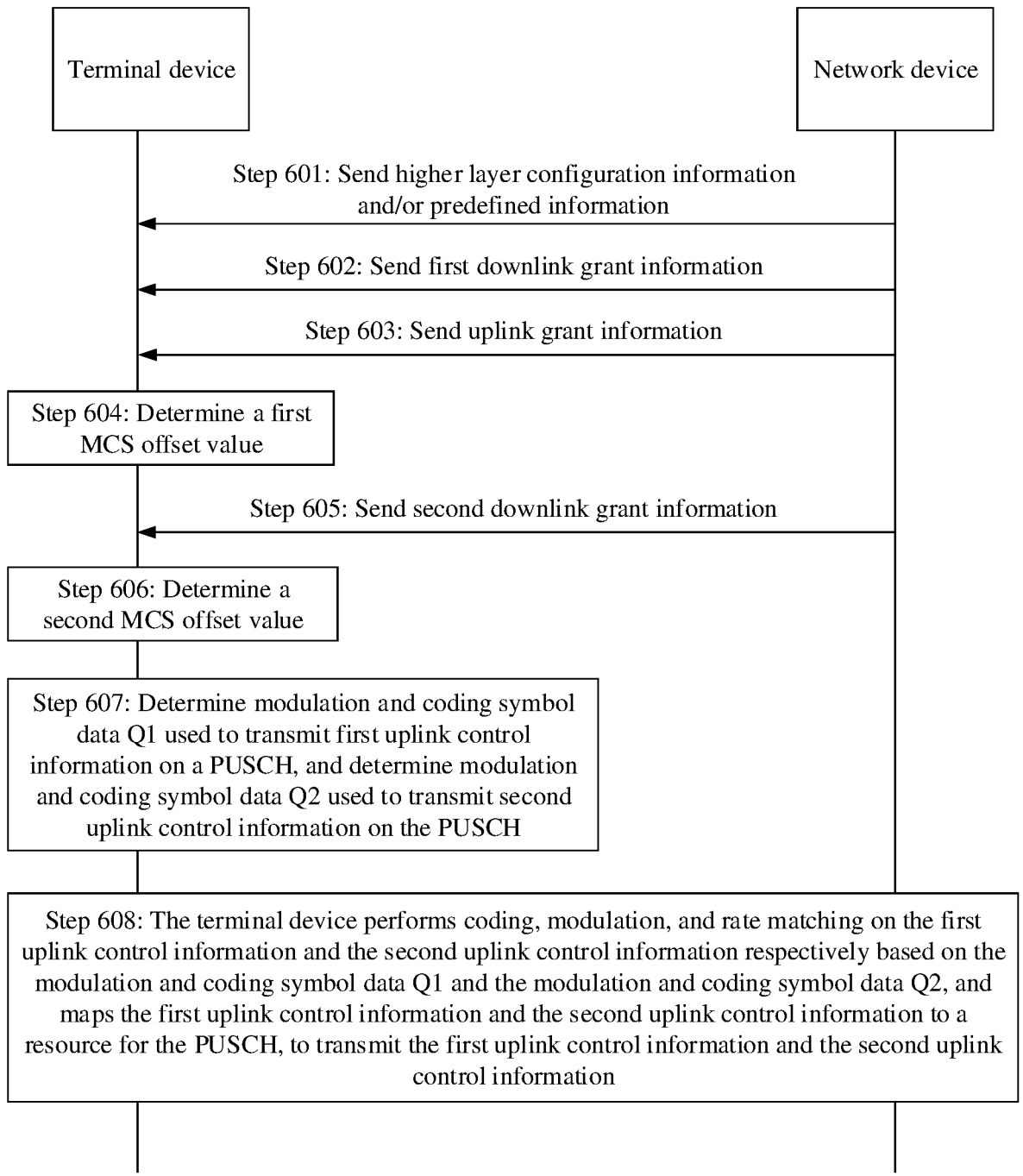
FIG. 9 is a flowchart of another uplink control information transmission method according to this application.
Figure 10:
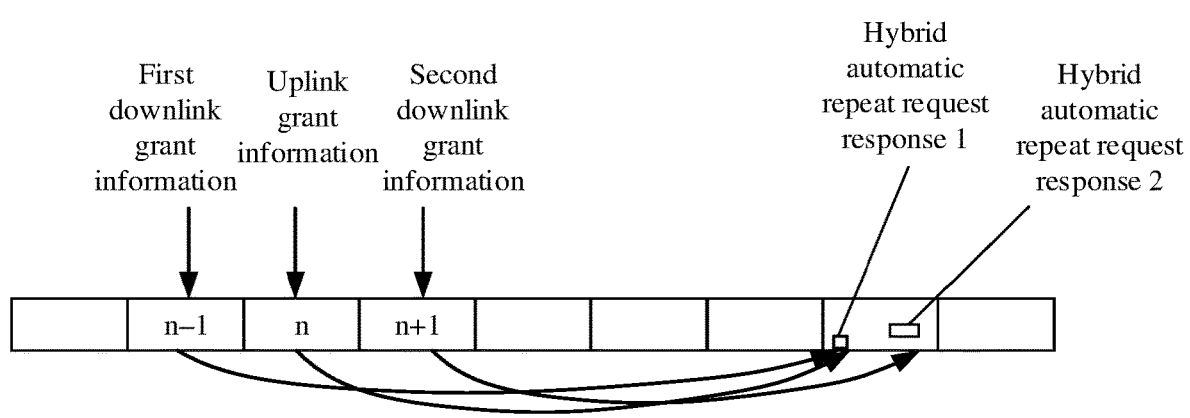
FIG. 10 is a schematic diagram of a transmission resource in the uplink control information transmission method shown in FIG. 9.

FIG. 9 is a flowchart of another uplink control information transmission method according to this application. FIG. 10 is a schematic diagram of a transmission resource in the uplink control information transmission method shown in FIG. 9. This embodiment is described by using an example in which first downlink control information is uplink grant information, and third downlink control information is second downlink grant information. Different from the second downlink grant information, first downlink grant information is downlink grant information sent before the uplink grant information. As shown in FIG. 9, the method in this embodiment may include the following steps.

Step 601: A terminal device receives higher layer configuration information and/or predefined information sent by a network device.

The higher layer configuration information and/or the predefined information carries a minimum data processing time requirement $\tau$ of the terminal device, and the minimum data processing time requirement $\tau$ is used to indicate a minimum processing time, required by the terminal device, between receiving downlink data through a PDSCH and generating a hybrid automatic repeat request response-acknowledgement/negative acknowledgement, or is used to indicate a required minimum processing time between receiving an A-CSI report scheduling request and completing channel measurement. $\tau$ may be any natural number. Specifically, $\tau$ may be flexibly set based on a requirement. This embodiment of this application is described by using an example in which $\tau=2$. To be specific, an example in which the required minimum processing time is two slots is used.

Step 602: The network device sends first downlink grant information to the terminal device.

The terminal device receives the first downlink grant information sent by the network device.

The first downlink grant information is used to perform at least one of scheduling the terminal device to receive downlink data through a PDSCH and feed back a corresponding hybrid automatic repeat request response-acknowledgement/negative acknowledgement and scheduling the terminal device to report A-CSI. The first downlink grant information further carries parameters K0 and K1, where the parameter K0 is used to indicate a transmission latency of the PDSCH, and the parameter K1 is used to indicate a feedback latency of the hybrid automatic repeat request response-acknowledgement/negative acknowledgement.

This embodiment of this application is described by using an example in which the network device sends the first downlink grant information to the terminal device in a slot n−1, the first downlink grant information is used to schedule the terminal device to receive the downlink data through the PDSCH and feed back the corresponding hybrid automatic repeat request response-acknowledgement/negative acknowledgement, K0=0, and K1=6. As shown in FIG. 10, the terminal device receives, in the slot n−1, the first downlink grant information sent by the network device, and receives the downlink data through the PDSCH in the slot n−1. Because K1=6, the terminal device learns that the hybrid automatic repeat request response-acknowledgement/negative acknowledgement corresponding to the PDSCH in the slot n−1 needs to be fed back to the network device in a slot n+5. The hybrid automatic repeat request response-acknowledgement/negative acknowledgement is denoted as a hybrid automatic repeat request response 1.

Step 603: The network device sends uplink grant information to the terminal device.

The terminal device receives the uplink grant information sent by the network device.

The uplink grant information is used to perform at least one scheduling the terminal device to send uplink data through a PUSCH, scheduling the terminal device to report A-CSI, and scheduling the terminal device to send other information that needs to be multiplexed and transmitted on the PUSCH. The uplink grant information carries a parameter K2, and the parameter K2 is used to indicate a transmission latency of the PUSCH.

This embodiment of this application is described by using an example in which the network device sends the uplink grant information to the terminal device in a slot n, the uplink grant information is used to schedule the terminal device to send the uplink data through the PUSCH, and K2=5. As shown in FIG. 10, the terminal device receives, in the slot n, the uplink grant information sent by the network device. Because K2=5, the terminal device learns that the uplink data is to be sent through the PUSCH in the slot n+5.

Step 604: The terminal device determines, based on the uplink grant information, a first MCS offset value used to multiplex and transmit first uplink control information UCI 1 on the PUSCH.

The examples in the foregoing steps are further described by using an example. In this embodiment, the first uplink control information UCI 1 includes a hybrid automatic repeat request response-acknowledgement/negative acknowledgement, and the hybrid automatic repeat request response-acknowledgement/negative acknowledgement is a hybrid automatic repeat request response-acknowledgement/negative acknowledgement corresponding to a PDSCH scheduled before the uplink grant information. In this embodiment, the hybrid automatic repeat request response-acknowledgement/negative acknowledgement may be the hybrid automatic repeat request response-acknowledgement/negative acknowledgement message corresponding to the PDSCH in step 602, that is, the hybrid automatic repeat request response 1.

The uplink grant information sent by the network device may explicitly or implicitly indicate the first MCS offset value to the terminal device, so that the terminal device can determine the first MCS offset value based on the uplink grant information. For a specific implementation of the explicit or implicit indication, refer to the foregoing descriptions. Details are not described herein again.

Step 605: The network device sends second downlink grant information to the terminal device.

The terminal device receives the second downlink grant information sent by the network device.

It should be noted that both the first downlink grant information and the second downlink grant information carry the parameters K0 and K1, where the parameter K0 is used to indicate a transmission latency of a PDSCH scheduled by each of the first downlink grant information and the second downlink grant information, the parameter K1 is used to indicate a feedback latency of a hybrid automatic repeat request response-acknowledgement/negative acknowledgement corresponding to each scheduled PDSCH.

This embodiment of this application is described by using an example in which the network device sends the second downlink grant information to the terminal device in a slot n+1, the second downlink grant information is used to schedule the terminal device to receive downlink data through the PDSCH and feed back the corresponding hybrid automatic repeat request response-acknowledgement/negative acknowledgement, K0 in the second downlink grant information is 0, and K1 in the second downlink grant information is 4. As shown in FIG. 10, the terminal device receives, in the slot n+1, the second downlink grant information sent by the network device, and receives the downlink data through the PDSCH in the slot n+1. Because K1=4, the terminal device learns that the hybrid automatic repeat request response-acknowledgement/negative acknowledgement corresponding to the PDSCH in the slot n+1 needs to be fed back to the network device in the slot n+5. The hybrid automatic repeat request response-acknowledgement/negative acknowledgement is denoted as a hybrid automatic repeat request response 2.

Step 606: The terminal device determines, based on the second downlink grant information, a second MCS offset value used to multiplex and transmit second uplink control information UCI 2 on the PUSCH.

The second uplink control information UCI 2 includes a hybrid automatic repeat request response-acknowledgement/negative acknowledgement, and the hybrid automatic repeat request response-acknowledgement/negative acknowledgement is a hybrid automatic repeat request response-acknowledgement/negative acknowledgement corresponding to a PDSCH scheduled after the uplink grant information. In this embodiment, the hybrid automatic repeat request response-acknowledgement/negative acknowledgement may be the hybrid automatic repeat request response-acknowledgement/negative acknowledgement message corresponding to the PDSCH in step 605, that is, the hybrid automatic repeat request response 2.

The second downlink grant information sent by the network device may explicitly or implicitly indicate the second MCS offset value to the terminal device, so that the terminal device can determine the second MCS offset value based on the second downlink grant information.

Step 607: The terminal device determines, based on the first MCS offset value, modulation and coding symbol data Q1 used to transmit the first uplink control information UCI 1 on the PUSCH, and determines, based on the second MCS offset value, modulation and coding symbol data Q2 used to transmit the second uplink control information UCI 2 on the PUSCH.

The example descriptions in the foregoing steps are further described by using an example. Because both the first uplink control information UCI 1 and the second uplink control information UCI 2 need to be transmitted in the slot n+5, that is, need to be multiplexed to the PUSCH, the terminal device needs to respectively determine, based on the first MCS offset value and the second MCS offset value, the modulation and coding symbol data used to transmit the first uplink control information UCI 1 and the second uplink control information UCI 2 on the PUSCH.

Step 608: The terminal device performs coding, modulation, and rate matching on the first uplink control information UCI 1 and the second uplink control information UCI 2 respectively based on the modulation and coding symbol data Q1 and the modulation and coding symbol data Q2, and maps the first uplink control information UCI 1 and the second uplink control information UCI 2 to a resource for the PUSCH, to transmit the first uplink control information UCI 1 and the second uplink control information UCI 2.

Specifically, the example descriptions in the foregoing steps are further described by using an example. As shown in FIG. 10, the terminal device sends the uplink data, the hybrid automatic repeat request response 1, and the hybrid automatic repeat request response 2 to the network device in the slot n+5. To be specific, the hybrid automatic repeat request response 1 and the hybrid automatic repeat request response 2 are separately mapped to the resource for the PUSCH, to transmit the hybrid automatic repeat request response 1 and the hybrid automatic repeat request response 2. The hybrid automatic repeat request response 1 and the hybrid automatic repeat request response 2 may be mapped to consecutive resource elements in the resource for the PUSCH, or may be mapped to nonconsecutive resource elements in the resource for the PUSCH, to transmit the hybrid automatic repeat request response 1 and the hybrid automatic repeat request response 2. Because information types of the hybrid automatic repeat request response 1 and the hybrid automatic repeat request response 2 are the same and are each a hybrid automatic repeat request response, the two responses may alternatively be combined and mapped to the resource for the PUSCH, to transmit the responses.

In this embodiment, the network device indicates the first MCS offset value and the second MCS offset value to the terminal device, and the terminal device maps, based on the first MCS offset value and/or the second MCS offset value, the first uplink control information and the second uplink control information to the resource for the physical uplink shared channel, to transmit the first uplink control information and the second uplink control information. The terminal device allocates, based on the first MCS offset value and the second MCS offset value, proper transmission resources to the first uplink control information, the second uplink control information, and the uplink data that is of the physical uplink shared channel, to balance a difference between transmission reliability requirements of the first uplink control information, the second uplink control information, and the uplink data, to match fluctuation of reliability requirements of transmission of a plurality of services and transmission of a plurality of pieces of uplink control information, so as to meet a requirement of the terminal device on a service.

Figure 11:
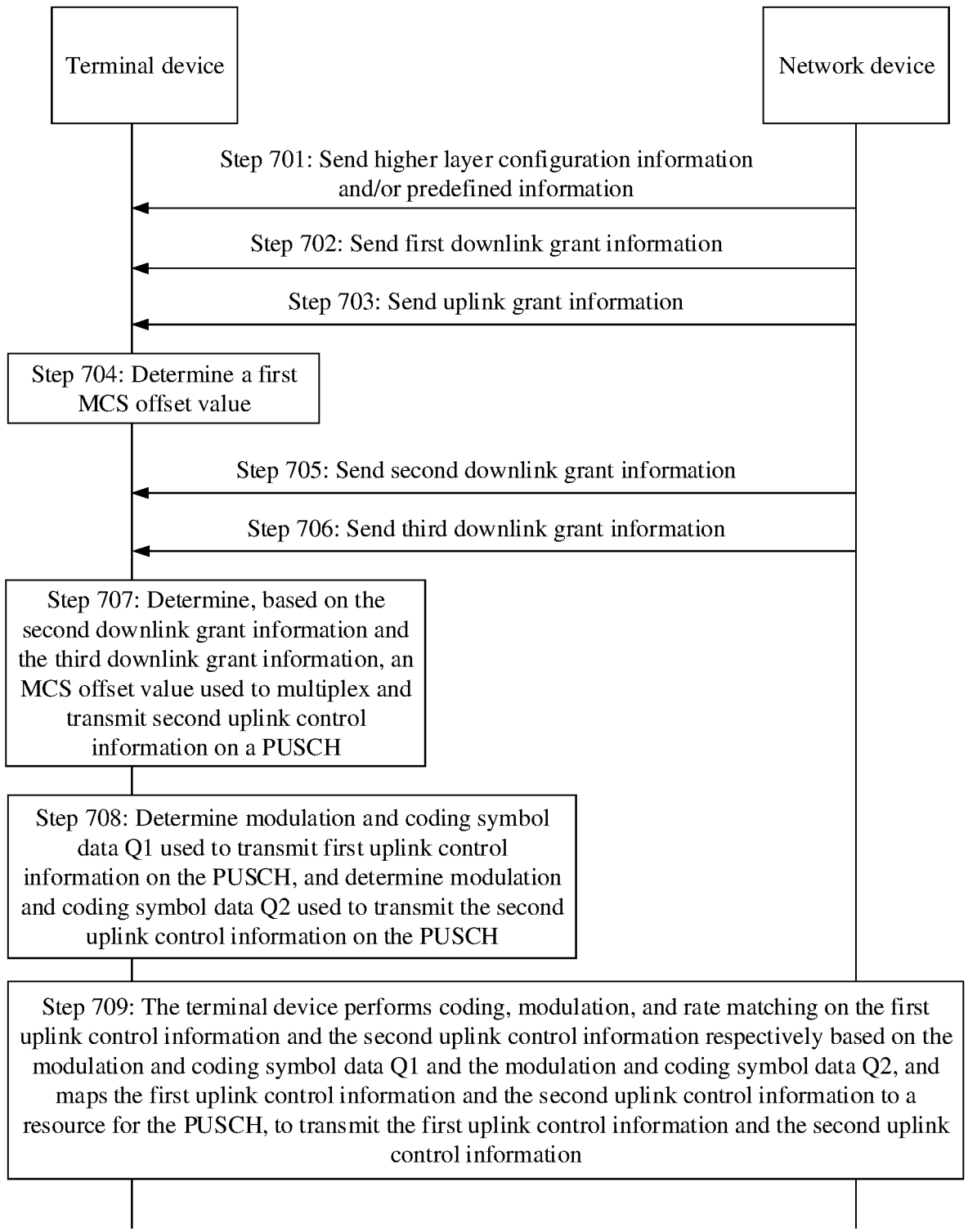
FIG. 11 is a flowchart of another uplink control information transmission method according to this application.
Figure 12:
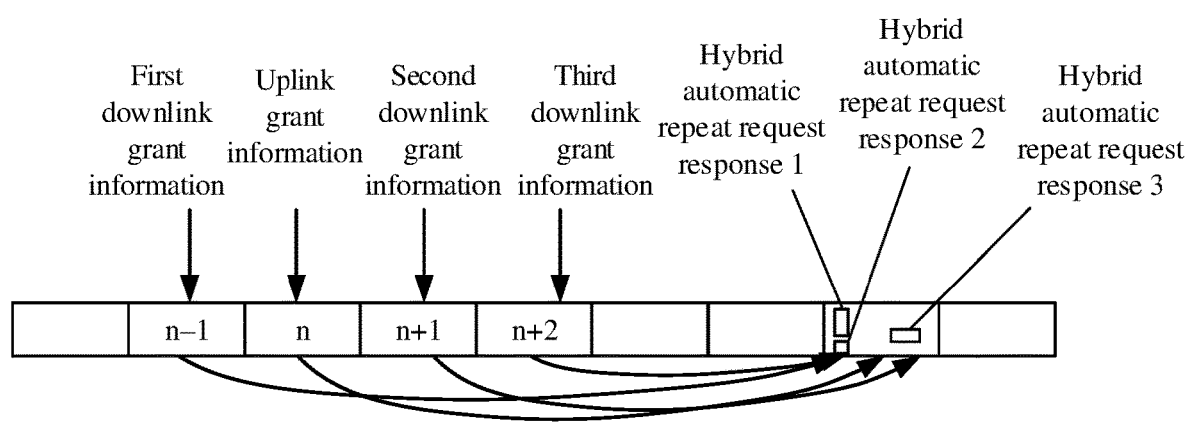
FIG. 12 is a schematic diagram of a transmission resource in the uplink control information transmission method shown in FIG. 11.

FIG. 11 is a flowchart of another uplink control information transmission method according to this application. FIG. 12 is a schematic diagram of a transmission resource in the uplink control information transmission method shown in FIG. 11. A difference between this embodiment and the embodiment shown in FIG. 9 lies in that a network device sends a plurality of pieces of downlink grant information to a terminal device after uplink grant information, that is, a plurality of pieces of third downlink control information are included in this embodiment. This embodiment is described by using an example in which the plurality of pieces of third downlink control information include second downlink grant information and third downlink grant information. As shown in FIG. 11, the method in this embodiment may include the following steps.

Step 701: The terminal device receives higher layer configuration information and/or predefined information sent by the network device.

The network device sends the higher layer configuration information and/or the predefined information to the terminal device.

Step 702: The network device sends first downlink grant information to the terminal device.

The terminal device receives the first downlink grant information sent by the network device.

Step 703: The network device sends uplink grant information to the terminal device.

The terminal device receives the uplink grant information sent by the network device.

Step 704: The terminal device determines, based on the uplink grant information, a first MCS offset value used to multiplex and transmit first uplink control information UCI 1 on a PUSCH.

For specific descriptions of step 701 to step 704, refer to step 601 to step 604 in the embodiment shown in FIG. 9. Details are not described herein again.

Step 705: The network device sends second downlink grant information to the terminal device.

The terminal device receives the second downlink grant information sent by the network device.

It should be noted that both the first downlink grant information and the second downlink grant information carry parameters K0 and K1, where the parameter K0 is used to indicate a transmission latency of a PDSCH scheduled by each of the first downlink grant information and the second downlink grant information, the parameter K1 is used to indicate a feedback latency of a hybrid automatic repeat request response-acknowledgement/negative acknowledgement corresponding to each scheduled PDSCH.

This embodiment of this application is described by using an example in which the network device sends the second downlink grant information to the terminal device in a slot n+1, the second downlink grant information is used to schedule the terminal device to receive downlink data through the PDSCH and feed back the corresponding hybrid automatic repeat request response-acknowledgement/negative acknowledgement, K0 in the second downlink grant information is 0, and K1 in the second downlink grant information is 4. As shown in FIG. 12, the terminal device receives, in the slot n+1, the second downlink grant information sent by the network device, and receives the downlink data through the PDSCH in the slot n+1. Because K1=4, the terminal device learns that the hybrid automatic repeat request response-acknowledgement/negative acknowledgement (ACK/NACK) corresponding to the PDSCH in the slot n+1 needs to be fed back to the network device in the slot n+5. The hybrid automatic repeat request response-acknowledgement/negative acknowledgement is denoted as a hybrid automatic repeat request response 2.

The second downlink grant information sent by the network device may explicitly or implicitly indicate a second MCS offset value to the terminal device, so that the terminal device can determine the second MCS offset value based on the second downlink grant information.

Step 706: The network device sends third downlink grant information to the terminal device.

The terminal device receives the third downlink grant information sent by the network device.

This embodiment of this application is described by using an example in which the network device sends the third downlink grant information to the terminal device in a slot n+2, the third downlink grant information is used to schedule the terminal device to receive downlink data through a PDSCH and feed back a corresponding hybrid automatic repeat request response-acknowledgement/negative acknowledgement, K0 in the third downlink grant information is 0, and K1 in the third downlink grant information is 3. As shown in FIG. 12, the terminal device receives, in the slot n+2, the third downlink grant information sent by the network device, and learns that the hybrid automatic repeat request response-acknowledgement/negative acknowledgement needs to be fed back to the network device in the slot n+5. The hybrid automatic repeat request response-acknowledgement/negative acknowledgement is denoted as a hybrid automatic repeat request response 3.

The third downlink grant information sent by the network device may explicitly or implicitly indicate a third MCS offset value to the terminal device, so that the terminal device can determine the third MCS offset value based on the third downlink grant information.

Step 707: The terminal device determines, based on the second downlink grant information and the third downlink grant information, an MCS offset value used to multiplex and transmit second uplink control information UCI 2 on the PUSCH.

The second uplink control information UCI 2 includes the hybrid automatic repeat request response 2 and the hybrid automatic repeat request response 3. The hybrid automatic repeat request response 2 is the hybrid automatic repeat request response-acknowledgement/negative acknowledgement corresponding to the PDSCH scheduled by the second downlink grant information, and the hybrid automatic repeat request response 3 is the hybrid automatic repeat request response-acknowledgement/negative acknowledgement corresponding to the PDSCH scheduled by the third downlink grant information.

Specifically, the terminal device may respectively determine two second MCS offset values based on the second downlink grant information and the third downlink grant information, where the two MCS offset values may be the same or may be different, and determines, based on the two second MCS offset values, the MCS offset value used to multiplex and transmit the second uplink control information UCI 2 on the PUSCH.

Step 708: The terminal device determines, based on the first MCS offset value, modulation and coding symbol data Q1 used to transmit the first uplink control information UCI 1 on the PUSCH, and determines, based on the MCS offset value used to transmit the second uplink control information UCI 2 on the PUSCH, modulation and coding symbol data Q2 used to transmit the second uplink control information UCI 2 on the PUSCH.

The example descriptions in the foregoing steps are further described by using an example. Because both the first uplink control information UCI 1 and the second uplink control information UCI 2 need to be transmitted in the slot n+5, that is, need to be multiplexed to the PUSCH, the terminal device needs to respectively determine, based on the first MCS offset value and the MCS offset value used to transmit the second uplink control information UCI 2 on the PUSCH, the modulation and coding symbol data used to transmit the first uplink control information UCI 1 and the second uplink control information UCI 2 on the PUSCH.

Step 709: The terminal device performs coding, modulation, and rate matching on the first uplink control information UCI 1 and the second uplink control information UCI 2 respectively based on the modulation and coding symbol data Q1 and the modulation and coding symbol data Q2, and maps the first uplink control information UCI 1 and the second uplink control information UCI 2 to a resource for the PUSCH, to transmit the first uplink control information UCI 1 and the second uplink control information UCI 2.

Specifically, the example descriptions in the foregoing steps are further described by using an example. As shown in FIG. 12, the terminal device sends uplink data, the hybrid automatic repeat request response 1, the hybrid automatic repeat request response 2, and the hybrid automatic repeat request response 3 to the network device in the slot n+5. To be specific, the hybrid automatic repeat request response 1, the hybrid automatic repeat request response 2, and the hybrid automatic repeat request response 3 are separately mapped to the resource for the PUSCH, to transmit the hybrid automatic repeat request response 1, the hybrid automatic repeat request response 2, and the hybrid automatic repeat request response 3. The hybrid automatic repeat request response 1, the hybrid automatic repeat request response 2, and the hybrid automatic repeat request response 3 may be mapped to consecutive resource elements in the resource for the PUSCH, or may be mapped to nonconsecutive resource elements in the resource for the PUSCH, to transmit the hybrid automatic repeat request response 1, the hybrid automatic repeat request response 2, and the hybrid automatic repeat request response 3.

In this embodiment, the network device indicates the first MCS offset value and the second MCS offset value to the terminal device, and the terminal device maps, based on the first MCS offset value and/or the second MCS offset value, the first uplink control information and the second uplink control information to the resource for the physical uplink shared channel, to transmit the first uplink control information and the second uplink control information. The terminal device allocates, based on the first MCS offset value and the second MCS offset value, proper transmission resources to the first uplink control information, the second uplink control information, and the uplink data that is of the physical uplink shared channel, to balance a difference between transmission reliability requirements of the first uplink control information, the second uplink control information, and the uplink data, to match fluctuation of reliability requirements of transmission of a plurality of services and transmission of a plurality of pieces of uplink control information, so as to meet a requirement of the terminal device on a service.

This application further provides an uplink control information transmission method different from the foregoing embodiments. An MCS offset value of uplink control information is decoupled from a single indication, and a target block error rate value of uplink data transmitted on a PUSCH, a target block error rate value of the UCI, and a payload size of the UCI are separately indicated to a terminal device, so that the terminal device determines, based on the foregoing indication and an MCS offset value mapping manner, a modulation and coding scheme MCS offset value used to multiplex and transmit the UCI on the PUSCH, and the terminal device maps, based on the MCS offset value, the uplink control information to a resource for the PUSCH, to transmit the uplink control information.

The following specifically explains and describes, by using several specific embodiments, the uplink control information transmission method.

Figure 13:
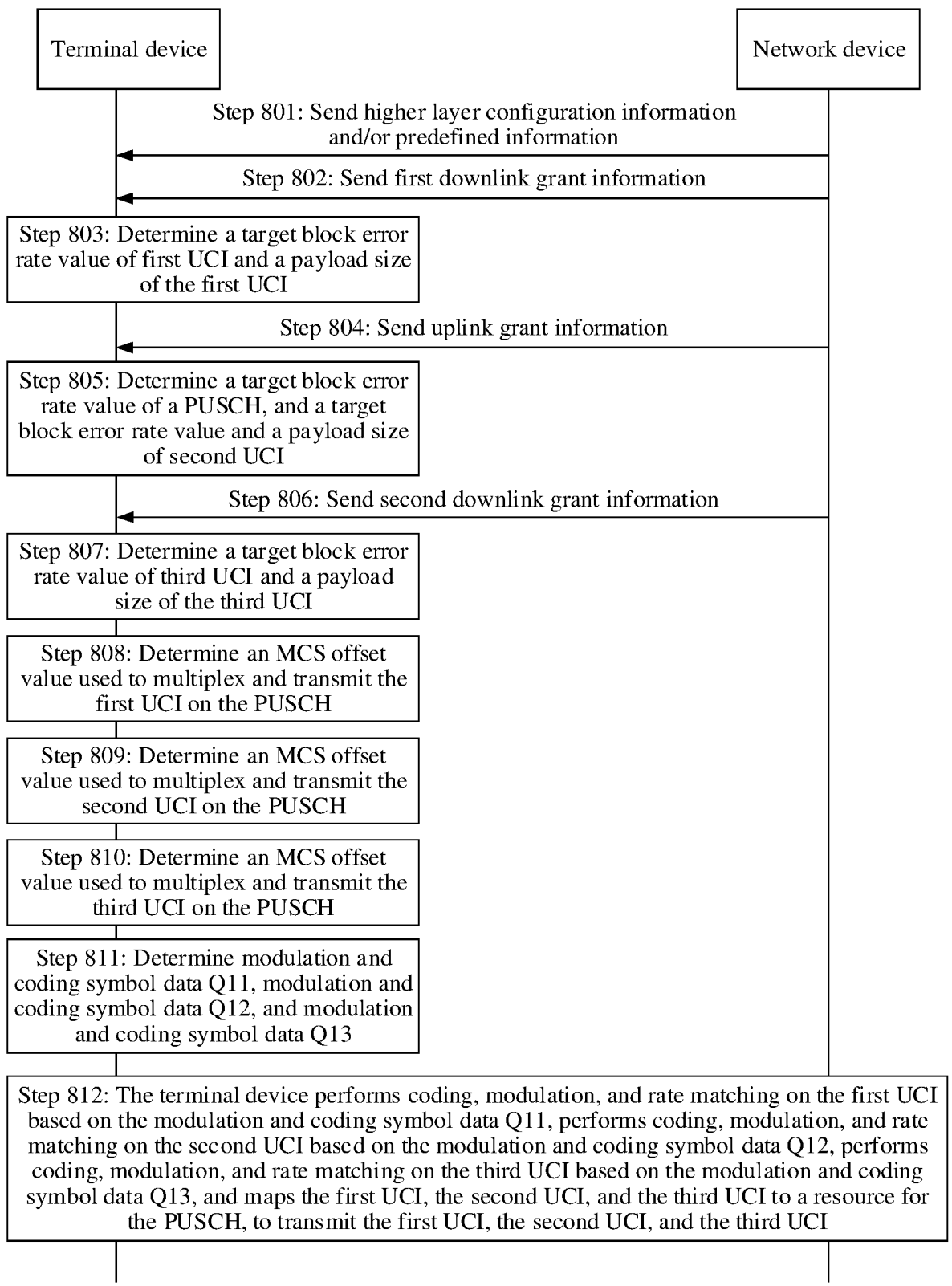
FIG. 13 is a flowchart of another uplink control information transmission method according to this application.
Figure 14:
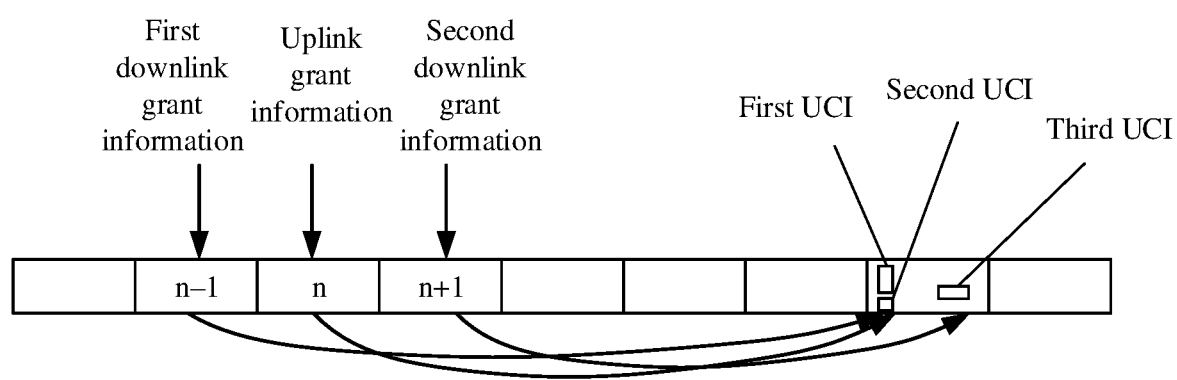
FIG. 14 is a schematic diagram of a transmission resource in the uplink control information transmission method shown in FIG. 13.

FIG. 13 is a flowchart of another uplink control information transmission method according to this application. FIG. 14 is a schematic diagram of a transmission resource in the uplink control information transmission method shown in FIG. 13. As shown in FIG. 13, the method in this embodiment may include the following steps.

Step 801: The terminal device receives higher layer configuration information and/or predefined information sent by a network device.

The network device sends the higher layer configuration information and/or the predefined information to the terminal device.

The higher layer configuration information and/or the predefined information carries a minimum data processing time requirement τ of the terminal device, and the minimum data processing time requirement τ is used to indicate a minimum processing time, required by the terminal device, between receiving downlink data through a PDSCH and generating a hybrid automatic repeat request response-acknowledgement/negative acknowledgement, or is used to indicate a required minimum processing time between receiving an A-CSI report scheduling request and completing channel measurement. τ may be any natural number. Specifically, τ may be flexibly set based on a requirement. This embodiment of this application is described by using an example in which τ=2. To be specific, an example in which the required minimum processing time is two slots is used.

Step 802: The network device sends first downlink grant information to the terminal device.

The terminal device receives the first downlink grant information sent by the network device.

The first downlink grant information is used to perform at least one of scheduling the terminal device to receive downlink data through a PDSCH and feed back a corresponding hybrid automatic repeat request response-acknowledgement/negative acknowledgement and scheduling the terminal device to report A-CSI. The first downlink grant information further carries parameters K0 and K1, where the parameter K0 is used to indicate a transmission latency of the PDSCH, and the parameter K1 is used to indicate a feedback latency of the hybrid automatic repeat request response-acknowledgement/negative acknowledgement.

This embodiment of this application is described by using an example in which the network device sends the first downlink grant information to the terminal device in a slot n−1, the first downlink grant information is used to schedule the terminal device to receive the downlink data through the PDSCH and feed back the corresponding hybrid automatic repeat request response-acknowledgement/negative acknowledgement, K0=0, and K1=7. As shown in FIG. 14, the terminal device receives, in the slot n−1, the first downlink grant information sent by the network device, and receives the downlink data through the PDSCH in the slot n−1. Because K1=7, the terminal device learns that the hybrid automatic repeat request response-acknowledgement/negative acknowledgement corresponding to the PDSCH in the slot n−1 needs to be fed back to the network device in a slot n+6.

Step 803: The terminal device determines a target block error rate value of first UCI and a payload size of the first UCI based on the first downlink grant information.

The first UCI is UCI scheduled by the first downlink grant information, and is a hybrid automatic repeat request response-acknowledgement/negative acknowledgement in this embodiment.

The terminal device may determine the target block error rate value of the first UCI and the payload size of the first UCI based on indication information included in the first downlink grant information, or may determine the payload size of the first UCI based on indication information in the first downlink grant information, and determine the target block error rate value of the first UCI based on a format of the first downlink grant information, or may determine the target block error rate value of the first UCI and the payload size of the first UCI based on a format of the first downlink grant information.

Step 804: The network device sends uplink grant information to the terminal device.

The uplink grant information is used to perform at least one scheduling the terminal device to send uplink data through a PUSCH, scheduling the terminal device to report A-CSI, and scheduling the terminal device to send other information that needs to be multiplexed and transmitted on the PUSCH. The uplink grant information carries a parameter K2, and the parameter K2 is used to indicate a transmission latency of the PUSCH.

This embodiment of this application is described by using an example in which the network device sends the uplink grant information to the terminal device in a slot n, the uplink grant information is used to schedule the terminal device to send the uplink data through the PUSCH and schedule the terminal device to report the A-CSI, and K2=6. As shown in FIG. 14, the terminal device receives, in the slot n, the uplink grant information sent by the network device. Because K2=6, the terminal device learns that the uplink data is to be sent through the PUSCH in the slot n+6, and the A-CSI is to be reported in the slot n+6.

Step 805: The terminal device determines a target block error rate value of the PUSCH and a target block error rate value and a payload size of second UCI based on the uplink grant information.

The second UCI is UCI scheduled by the uplink grant information, and is the A-CSI in this embodiment.

The terminal device may determine the target block error rate value of the second UCI and the payload size of the second UCI based on indication information included in the uplink grant information, or may determine the payload size of the second UCI based on indication information in the uplink grant information, and determine the target block error rate value of the second UCI based on a format of the uplink grant information, or may determine the target block error rate value of the second UCI and the payload size of the second UCI based on a format of the uplink grant information.

Step 806: The network device sends second downlink grant information to the terminal device.

The terminal device receives the second downlink grant information sent by the network device.

It should be noted that both the first downlink grant information and the second downlink grant information carry parameters K0 and K1, where the parameter K0 is used to indicate a transmission latency of a PDSCH scheduled by each of the first downlink grant information and the second downlink grant information, the parameter K1 is used to indicate a feedback latency of a hybrid automatic repeat request response-acknowledgement/negative acknowledgement corresponding to each scheduled PDSCH.

This embodiment of this application is described by using an example in which the network device sends the second downlink grant information to the terminal device in a slot n+1, the second downlink grant information is used to schedule the terminal device to receive downlink data through the PDSCH and feed back the corresponding hybrid automatic repeat request response-acknowledgement/negative acknowledgement, K0 in the second downlink grant information is 0, and K1 in the second downlink grant information is 5. As shown in FIG. 14, the terminal device receives, in the slot n+1, the second downlink grant information sent by the network device, and receives the downlink data through the PDSCH in the slot n+1. Because K1=5, the terminal device learns that the hybrid automatic repeat request response-acknowledgement/negative acknowledgement corresponding to the PDSCH in the slot n+1 needs to be fed back to the network device in the slot n+6.

Step 807: The terminal device determines a target block error rate value of third UCI and a payload size of the third UCI based on the second downlink grant information.

The terminal device may determine the target block error rate value of the third UCI and the payload size of the third UCI based on indication information included in the second downlink grant information, or may determine the payload size of the third UCI based on indication information in the second downlink grant information, and determine the target block error rate value of the third UCI based on a format of the second downlink grant information, or may determine the target block error rate value of the third UCI and the payload size of the third UCI based on a format of the second downlink grant information.

Step 808: The terminal device determines, based on the target block error rate value of the uplink data carried on the PUSCH, the target block error rate value of the first UCI, the payload size of the first UCI, and an MCS offset value mapping manner, an MCS offset value used to multiplex and transmit the first UCI on the PUSCH.

Step 809: The terminal device determines, based on the target block error rate value of the uplink data carried on the PUSCH, the target block error rate value of the second UCI, the payload size of the second UCI, and the MCS offset value mapping manner, an MCS offset value used to multiplex and transmit the second UCI on the PUSCH.

Step 810: The terminal device determines, based on the target block error rate value of the uplink data carried on the PUSCH, the target block error rate value of the third UCI, the payload size of the third UCI, and the MCS offset value mapping manner, an MCS offset value used to multiplex and transmit the third UCI on the PUSCH.

Step 811: The terminal device determines, based on the MCS offset value used to multiplex and transmit the first UCI on the PUSCH, modulation and coding symbol data Q11 used to transmit the uplink control information on the PUSCH, determines, based on the MCS offset value used to multiplex and transmit the second UCI on the PUSCH, modulation and coding symbol data Q12 used to transmit the uplink control information on the PUSCH, and determines, based on the MCS offset value used to multiplex and transmit the third UCI on the PUSCH, modulation and coding symbol data Q13 used to transmit the uplink control information on the PUSCH.

Step 812: The terminal device performs coding, modulation, and rate matching on the first UCI based on the modulation and coding symbol data Q11, performs coding, modulation, and rate matching on the second UCI based on the modulation and coding symbol data Q12, performs coding, modulation, and rate matching on the third UCI based on the modulation and coding symbol data Q13, and maps the first UCI, the second UCI, and the third UCI to a resource for the PUSCH, to transmit the first UCI, the second UCI, and the third UCI.

Specifically, as shown in FIG. 14, the terminal device sends the uplink data, the first UCI, the second UCI, and the third UCI to the network device through the PUSCH in the slot n+6.

In this embodiment, the MCS offset value of the uplink control information is decoupled from single indication, to flexibly match a reliability requirement of service transmission.

Figure 15:
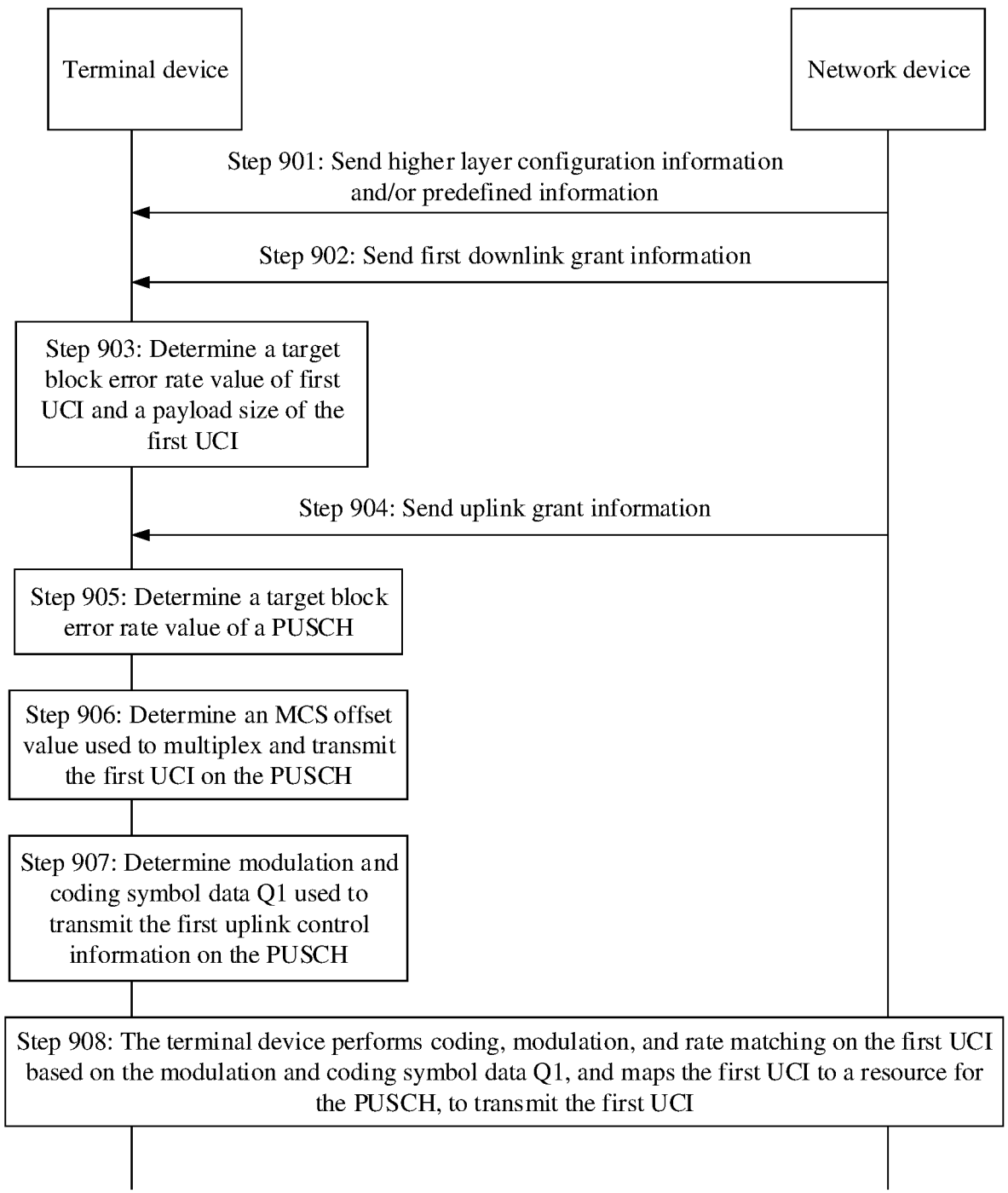
FIG. 15 is a flowchart of another uplink control information transmission method according to this application.
Figure 16:
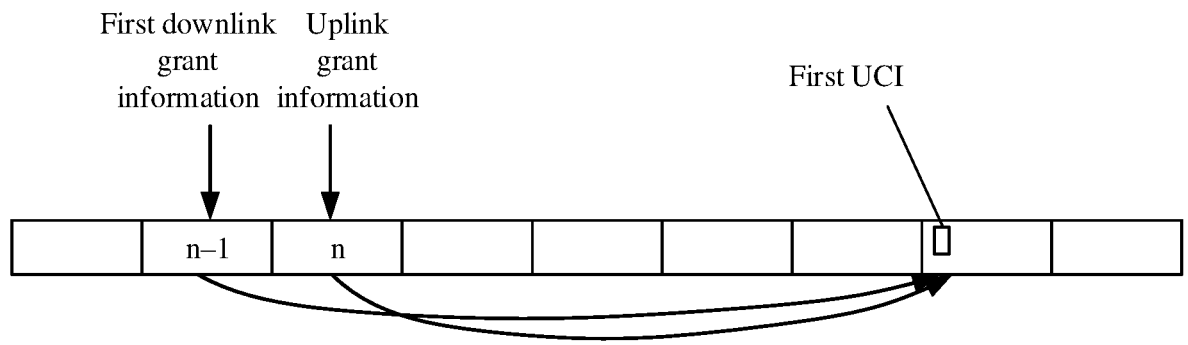
FIG. 16 is a schematic diagram of a transmission resource in the uplink control information transmission method shown in FIG. 15.

FIG. 15 is a flowchart of another uplink control information transmission method according to this application. FIG. 16 is a schematic diagram of a transmission resource in the uplink control information transmission method shown in FIG. 15. Different from the embodiment shown in FIG. 12, uplink grant information in this embodiment is compact uplink grant information (Compact UL Grant). As shown in FIG. 15, the method in this embodiment may include the following steps.

Step 901: A terminal device receives higher layer configuration information and/or predefined information sent by a network device.

The network device sends the higher layer configuration information and/or the predefined information to the terminal device.

The higher layer configuration information and/or the predefined information carries a minimum data processing time requirement $\tau$ of the terminal device, and the minimum data processing time requirement $\tau$ is used to indicate a minimum processing time, required by the terminal device, between receiving downlink data through a PDSCH and generating a hybrid automatic repeat request response-acknowledgement/negative acknowledgement, or is used to indicate a required minimum processing time between receiving an A-CSI report scheduling request and completing channel measurement. $\tau$ may be any natural number. Specifically, $\tau$ may be flexibly set based on a requirement. This embodiment of this application is described by using an example in which $\tau=1$. To be specific, an example in which the required minimum processing time is one slot is used.

Step 902: The network device sends first downlink grant information to the terminal device.

The terminal device receives the first downlink grant information sent by the network device.

The first downlink grant information is used to perform at least one of scheduling the terminal device to receive downlink data through a PDSCH and feed back a corresponding hybrid automatic repeat request response-acknowledgement/negative acknowledgement and scheduling the terminal device to report A-CSI. The first downlink grant information further carries parameters K0 and K1, where the parameter K0 is used to indicate a transmission latency of the PDSCH, and the parameter K1 is used to indicate a feedback latency of the hybrid automatic repeat request response-acknowledgement/negative acknowledgement.

This embodiment of this application is described by using an example in which the network device sends the first downlink grant information to the terminal device in a slot n−1, the first downlink grant information is used to schedule the terminal device to receive the downlink data through the PDSCH and feed back the corresponding hybrid automatic repeat request response-acknowledgement/negative acknowledgement, K0=0, and K1=4. As shown in FIG. 16, the terminal device receives, in the slot n−1, the first downlink grant information sent by the network device, and receives the downlink data through the PDSCH in the slot n−1. Because K1=4, the terminal device learns that the hybrid automatic repeat request response-acknowledgement/negative acknowledgement corresponding to the PDSCH in the slot n−1 needs to be fed back to the network device in a slot n+3.

The first downlink grant information may be common downlink grant information or compact downlink grant information. When the first downlink grant information is common downlink grant information, the first downlink grant information includes a target block error rate value indication bit field. When the first downlink grant information is compact downlink grant information, the first downlink grant information does not include the bit field, and implicitly indicates a target block error rate value configured by a higher layer.

Step 903: The terminal device determines a target block error rate value of first UCI and a payload size of the first UCI based on the first downlink grant information.

The first UCI is UCI scheduled by the first downlink grant information, and is a hybrid automatic repeat request response-acknowledgement/negative acknowledgement in this embodiment.

The foregoing example is further described by using as an example. The terminal device receives, in the slot n−1, the DL grant and the PDSCH that are sent by the network device, and learns that the terminal device needs to send the corresponding hybrid automatic repeat request response-acknowledgement/negative acknowledgement in the slot n+3. The terminal device determines a payload size of the hybrid automatic repeat request response-acknowledgement/negative acknowledgement based on the first downlink grant information, and the terminal device determines a target block error rate value of the hybrid automatic repeat request response-acknowledgement/negative acknowledgement based on a format of the first downlink grant information and the higher layer configuration information.

Step 904: The network device sends uplink grant information to the terminal device.

The uplink grant information is used to perform at least one scheduling the terminal device to send uplink data through a PUSCH, scheduling the terminal device to report A-CSI, and scheduling the terminal device to send other information that needs to be multiplexed and transmitted on the PUSCH. The uplink grant information carries a parameter K2, and the parameter K2 is used to indicate a transmission latency of the PUSCH.

This embodiment of this application is described by using an example in which the network device sends the uplink grant information to the terminal device in a slot n, the uplink grant information is compact uplink grant information, the uplink grant information used to schedule the terminal device to send the uplink data through the PUSCH, and K2=3. As shown in FIG. 16, the terminal device receives, in the slot n, the uplink grant information sent by the network device. Because K2=3, the terminal device learns that the uplink data is to be sent through the PUSCH in the slot n+3.

Step 905: The terminal device determines a target block error rate value of the PUSCH based on the uplink grant information.

Because the terminal device receives, in the slot n, the compact uplink grant information sent by the network device, and learns that the terminal device needs to send the uplink data through the PUSCH in the slot n+3, the terminal device determines, based on the format of the compact uplink grant information and the higher layer configuration information, the target block error rate value for scheduling the PUSCH transmission.

Step 906: The terminal device determines, based on the target block error rate value of the PUSCH transmission, the target block error rate value of the first UCI, the payload size of the first UCI, and an MCS offset value mapping manner, a modulation and coding scheme MCS offset value used to multiplex and transmit the first UCI on the PUSCH.

Step 907: The terminal device determines, based on the MCS offset value used to multiplex and transmit the first UCI on the PUSCH, modulation and coding symbol data Q1 used to transmit the first uplink control information on the PUSCH.

Step 908: The terminal device performs coding, modulation, and rate matching on the first UCI based on the modulation and coding symbol data Q1, and maps the first UCI to a resource for the PUSCH, to transmit the first UCI.

Specifically, as shown in FIG. 16, the terminal device sends the uplink data and the first UCI to the network device through the PUSCH in the slot n+3.

In this embodiment, the MCS offset value of the uplink control information is decoupled from single indication, to flexibly match a reliability requirement of service transmission.

It may be understood that, in the foregoing embodiments, the methods or steps implemented by the terminal device may alternatively be implemented by a chip inside the terminal device, and the method or steps implemented by the network device may alternatively be implemented by a chip inside the network device.

Figure 17:
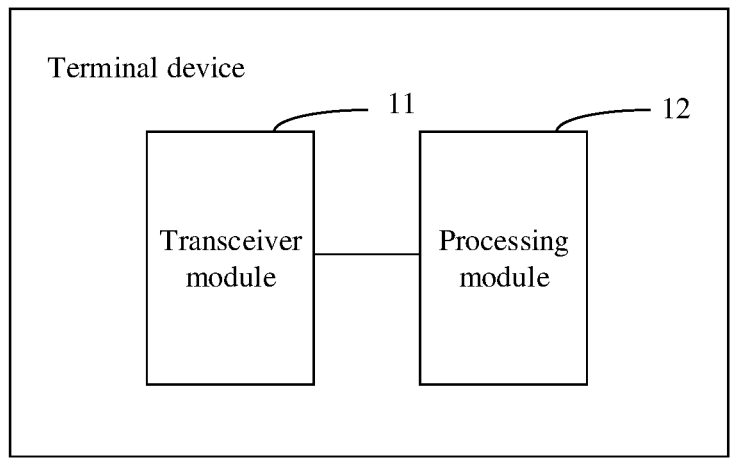
FIG. 17 is a schematic structural diagram of a terminal device according to an embodiment of this application.

FIG. 17 is a schematic structural diagram of a terminal device according to an embodiment of this application. As shown in FIG. 17, the terminal device in this embodiment includes a receiving module 11 and a processing module 12.

The processing module 12 is configured to obtain a first modulation and coding scheme offset value used to multiplex and transmit first uplink control information on a physical uplink shared channel, where the first modulation and coding scheme offset value is less than 1, and the transceiver module 11 is configured to map, based on the first modulation and coding scheme offset value, the first uplink control information to a resource for the physical uplink shared channel, to transmit the first uplink control information.

In some embodiments, the transceiver module 11 is configured to receive first downlink control information, where the first downlink control information is used to schedule the physical uplink shared channel and/or the first uplink control information, and the resource for the physical uplink shared channel and an uplink control channel resource that carries the first uplink control information overlap in time domain, and the processing module is configured to determine the first modulation and coding scheme offset value based on a format of the first downlink control information.

In some embodiments, the processing module 12 is further configured to determine the format of the first downlink control information based on a quantity of bits in the first downlink control information, indication information of at least one preset bit field in the first downlink control information, or a type of search space that carries the first downlink control information.

In some embodiments, the processing module 12 is configured to when the first downlink control information is compact downlink control information, determine that the first modulation and coding scheme offset value is a first preset value, where the first preset value is a value configured by using higher layer signaling or a predefined value.

In some embodiments, the transceiver module 11 is further configured to receive higher layer signaling, where the higher layer signaling is used to indicate configuration information for a modulation and coding scheme offset value used to multiplex uplink control information on a physical uplink shared channel, and the processing module 12 is configured to determine at least one a type and a payload size of the first uplink control information, and determine the first modulation and coding scheme offset value based on the configuration information for a modulation and coding scheme offset value, the at least one of the type and the payload size of the first uplink control information, and the format of the first downlink control information.

In some embodiments, the transceiver module 11 is configured to receive higher layer signaling, where the higher layer signaling is used to indicate configuration information for a modulation and coding scheme offset value used to multiplex and transmit uplink control information on a grant-free physical uplink shared channel, and receive second downlink control information, where the second downlink control information is used to schedule the first uplink control information, and an uplink control channel resource that carries the first uplink control information and a resource for the grant-free physical uplink shared channel overlap in time domain, and the processing module 12 is configured to determine the first MCS offset value based on the configuration information for a modulation and coding scheme offset value and/or a format of the second downlink control information.

In some embodiments, the processing module 12 is configured to determine at least one of a type and a payload size of the first uplink control information, and determine the first modulation and coding scheme offset value based on the configuration information for a modulation and coding scheme offset value used to multiplex uplink control information on a physical uplink shared channel, the at least one of the type and the payload size of the first uplink control information, and the format of the second downlink control information.

In some embodiments, the processing module 12 is further configured to obtain a second modulation and coding scheme offset value used to multiplex and transmit second uplink control information on the physical uplink shared channel, where the second modulation and coding scheme offset value is greater than or equal to 1, or the less than 1, and map, based on the first modulation and coding scheme offset value and/or the second modulation and coding scheme offset value, the first uplink control information and the second uplink control information to the resource for the physical uplink shared channel, to transmit the first uplink control information and the second uplink control information.

In some embodiments, the transceiver module 11 is configured to receive higher layer signaling, where the higher layer signaling is used to indicate the second modulation and coding scheme offset value used to multiplex the second uplink control information on the physical uplink shared channel, and the processing module is configured to obtain, based on the higher layer signaling, the second modulation and coding scheme offset value used to multiplex the second uplink control information on the physical uplink shared channel, or the transceiver module 11 is configured to receive at least one piece of third downlink control information, where the at least one piece of third downlink control information is used to schedule a physical downlink shared channel and the second uplink control information, and the resource for the physical uplink shared channel and an uplink control channel resource that carries the second uplink control information overlap in time domain, and the processing module is configured to obtain, based on the at least one piece of third downlink control information, the second modulation and coding scheme offset value used to multiplex the second uplink control information on the physical uplink shared channel.

In some embodiments, the processing module 12 is configured to determine the second modulation and coding scheme offset value based on a format of the at least one piece of third downlink control information.

In some embodiments, the processing module 12 is further configured to determine the format of the third downlink control information based on a quantity of bits in the third downlink control information, indication information of at least one preset bit field in the third downlink control information, or a type of search space that carries the third downlink control information.

In some embodiments, the processing module 12 is configured to respectively obtain a receiving time difference between the first downlink control information and the at least one piece of third downlink control information, and determine the second modulation and coding scheme offset value based on the receiving time difference between the first downlink control information and the at least one piece of third downlink control information.

In this embodiment, the terminal device described above may be configured to perform the technical solutions performed by the terminal device or a chip of the terminal device in the foregoing method embodiments. Their implementation principles and technical effects are similar. For functions of the modules, refer to corresponding descriptions in the method embodiments. Details are not described herein again.

Figure 18:
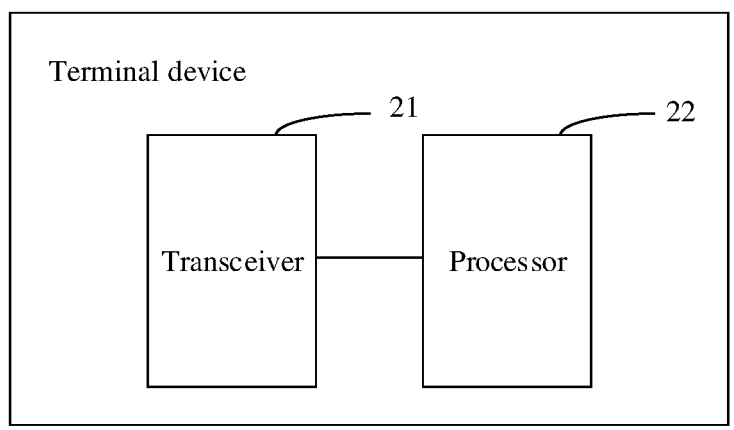
FIG. 18 is a schematic structural diagram of a terminal device according to another embodiment of this application.

FIG. 18 is a schematic structural diagram of a terminal device according to another embodiment of this application. As shown in FIG. 18, the terminal device in this embodiment includes a transceiver 21 and a processor 22.

In hardware implementation, the transceiver module 11 may be the transceiver 21 in this embodiment. The processing module 12 may be built in or independent of the processor 22 of the terminal device in a hardware form.

The transceiver 21 may include a necessary radio frequency communications component, such as a frequency mixer. The processor 22 may include at least one of a central processing unit (CPU), a digital signal processor (DSP), a microcontroller unit (MCU), an application-specific integrated circuit (ASIC), or a field programmable logic gate array (FPGA).

Optionally, the terminal device in this embodiment may further include a memory. The memory is configured to store a program instruction, and the processor 22 is configured to invoke the program instruction in the memory to perform the foregoing solutions.

The program instruction may be implemented in a form of a software functional unit and can be sold or used as an independent product. The memory may be a computer-readable storage medium in any form. Based on such an understanding, all or some of the technical solutions of this application may be implemented in a form of a software product including several instructions, to enable a computer device that may be specifically the processor 22 to perform all or some of the steps of the terminal device in the embodiments of this application. The foregoing computer-readable storage medium includes any medium that can store program code, such as a USB flash drive, a removable hard disk, a read-only memory (ROM), a random access memory (RAM), a magnetic disk, or an optical disc.

In this embodiment, the terminal device described above may be configured to perform the technical solutions performed by the terminal device or a chip of the terminal device in the foregoing method embodiments. Their implementation principles and technical effects are similar. For functions of the components, refer to corresponding descriptions in the method embodiments. Details are not described herein again.

Figure 19:
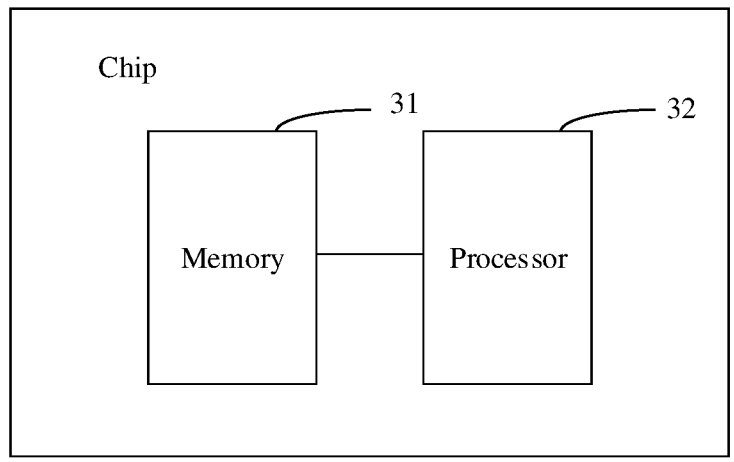
FIG. 19 is a schematic structural diagram of a chip according to an embodiment of this application.

FIG. 19 is a schematic structural diagram of a chip according to an embodiment of this application. As shown in FIG. 19, the chip in this embodiment may function as a chip of a terminal device, and the chip in this embodiment may include a memory 31 and a processor 32. The memory 31 is in a communication connection to the processor 32.

In hardware implementation, the transceiver module 11 and the processing module 12 may be built in or independent of the processor 32 of the chip in a hardware form.

The memory 31 is configured to store a program instruction, and the processor 32 is configured to invoke the program instruction in the memory 31 to execute the foregoing solutions.

In this embodiment, the chip described above may be configured to perform the technical solutions of the terminal device or a chip inside the terminal device in the foregoing method embodiments of this application. Their implementation principles and technical effects are similar. For functions of the modules, refer to corresponding descriptions in the method embodiments. Details are not described herein again.

Figure 20:
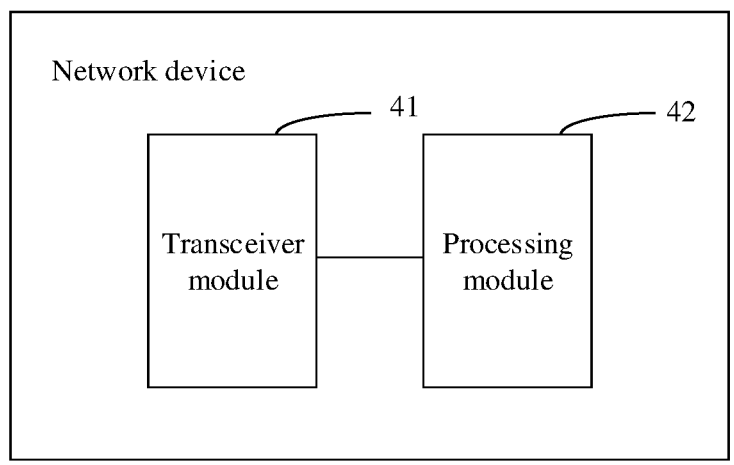
FIG. 20 is a schematic structural diagram of a network device according to an embodiment of this application.

FIG. 20 is a schematic structural diagram of a network device according to an embodiment of this application. As shown in FIG. 20, the network device in this embodiment includes a transceiver module 41 and a processing module 42.

The transceiver module 41 is configured to send a first modulation and coding scheme offset value, where the first modulation and coding scheme offset value is less than 1, and processing module 42 is configured to receive first uplink control information on a physical uplink shared channel based on the first modulation and coding scheme offset value.

In some embodiments, the transceiver module 41 is configured to send first downlink control information, where the first downlink control information is used to schedule the physical uplink shared channel and/or the first uplink control information, the resource for the physical uplink shared channel and an uplink control channel resource that carries the first uplink control information overlap in time domain, and a format of the first downlink control information is used to indicate the first modulation and coding scheme offset value.

In some embodiments, the transceiver module 41 is configured to send higher layer signaling, where the higher layer signaling is used to indicate configuration information for a modulation and coding scheme offset value used to multiplex and transmit uplink control information on a grant-free physical uplink shared channel, and send second downlink control information, where the second downlink control information is used to schedule the first uplink control information, and a format of the second downlink control information is used to instruct a terminal device to determine the first modulation and coding scheme offset value based on the configuration information for a modulation and coding scheme offset value and/or the format of the second downlink control information.

In some embodiments, the transceiver module 41 is further configured to send a second modulation and coding scheme offset value, where the second modulation and coding scheme offset value is greater than or equal to 1, or the second modulation and coding scheme offset value is less than 1, and the processing module 42 is further configured to receive the first uplink control information and second uplink control information on the physical uplink shared channel based on the first modulation and coding scheme offset value and/or the second modulation and coding scheme offset value.

In some embodiments, the transceiver module 41 is configured to send higher layer signaling, where the higher layer signaling is used to indicate the second modulation and coding scheme offset value used to multiplex the second uplink control information on the physical uplink shared channel, or send at least one piece of third downlink control information, where the at least one piece of third downlink control information is used to indicate the second modulation and coding scheme offset value used to multiplex the second uplink control information on the physical uplink shared channel.

In some embodiments, the transceiver module 41 is configured to send the at least one piece of third downlink control information, where a format of the at least one piece of third downlink control information is used to indicate the second modulation and coding scheme offset value used to multiplex the second uplink control information on the physical uplink shared channel.

In some embodiments, the transceiver module 41 is configured to send the at least one piece of third downlink control information, where a receiving time difference between the first downlink control information and the at least one piece of third downlink control information is used to indicate the second modulation and coding scheme offset value.

In this embodiment, the network device described above may be configured to perform the technical solutions performed by the network device or a chip of the network device in the foregoing method embodiments. Their implementation principles and technical effects are similar. For functions of the modules, refer to corresponding descriptions in the method embodiments. Details are not described herein again.

Figure 21:
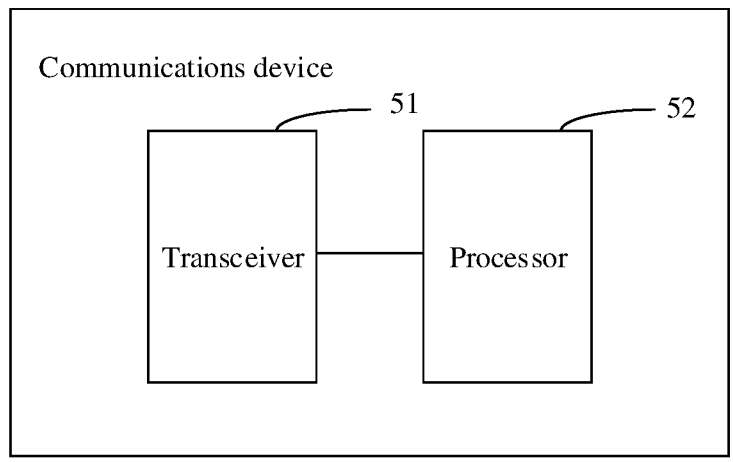
FIG. 21 is a schematic structural diagram of a network device according to another embodiment of this application.

FIG. 21 is a schematic structural diagram of a network device according to another embodiment of this application. As shown in FIG. 21, the network device in this embodiment includes a transceiver 51 and a processor 52.

In hardware implementation, the transceiver module 41 may be the transceiver 51 in this embodiment.

The transceiver 51 may include a necessary radio frequency communications component, such as a frequency mixer. The processor 52 may include at least one of a CPU, a DSP, an MCU, an ASIC, or an FPGA.

Optionally, the network device in this embodiment may further include a memory. The memory is configured to store a program instruction, and the transceiver 51 is configured to invoke the program instruction in the memory to perform the foregoing solutions.

In this embodiment, the network device described above may be configured to perform the technical solutions performed by the network device or a chip of the network device in the foregoing method embodiments. Their implementation principles and technical effects are similar. For functions of the components, refer to corresponding descriptions in the method embodiments. Details are not described herein again.

Figure 22:
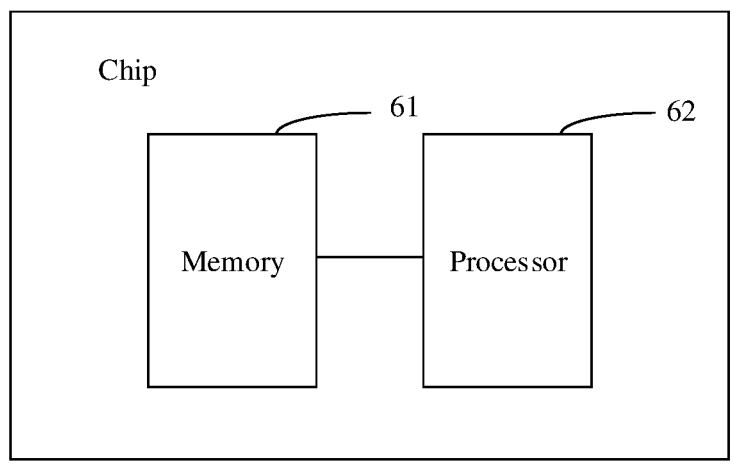
FIG. 22 is a schematic structural diagram of a chip according to another embodiment of this application.

FIG. 22 is a schematic structural diagram of a chip according to another embodiment of this application. As shown in FIG. 22, the chip in this embodiment may function as a chip of a network device, and the chip in this embodiment may include a memory 61 and a processor 62. The memory 61 is in a communication connection to the processor 62. The processor 62 may include, for example, at least one of a CPU, a DSP, an MCU, an ASIC, or an FPGA.

In hardware implementation, the transceiver module 41 may be built in or independent of the processor 62 of the chip in a hardware form.

The memory 61 is configured to store a program instruction, and the processor 62 is configured to invoke the program instruction in the memory 61 to execute the foregoing solutions.

The program instruction may be implemented in a form of a software functional unit and can be sold or used as an independent product. The memory may be a computer-readable storage medium in any form. Based on such an understanding, all or some of the technical solutions of this application may be implemented in a form of a software product including several instructions, to enable a computer device that may be specifically the processor 62 to perform all or some of the steps of the network device in the embodiments of this application. The foregoing computer-readable storage medium includes any medium that can store program code, such as a USB flash drive, a removable hard disk, a ROM, a RAM, a magnetic disk, or an optical disc.

In this embodiment, the chip described above may be configured to perform the technical solutions of the network device or a chip inside the network device in the foregoing method embodiments of this application. Their implementation principles and technical effects are similar. For functions of the modules, refer to corresponding descriptions in the method embodiments, and details are not described herein.

It should be noted that, in the embodiments of this application, division into the modules is an example, is merely logical function division, and may be other division in an actual implementation. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method for uplink control information transmission, comprising:
    obtaining, from a network device, a first modulation and coding scheme offset value used to multiplex first uplink control information and a second modulation and coding scheme offset value used to multiplex second uplink control information, respectively, on a physical uplink shared channel, wherein the first modulation and coding scheme offset value is less than 1, and the second modulation and coding scheme offset value is greater than or equal to 1, wherein the obtaining the first modulation and coding scheme offset value comprises receiving a first downlink control information from the network device, wherein the first downlink control information is associated with scheduling of at least one of the physical uplink shared channel or the first uplink control information, and wherein a resource for the physical uplink shared channel overlaps, in a time domain, with an uplink control channel resource that carries the first uplink control information; and
    mapping, respectively, according to the first modulation and coding scheme offset value and the second modulation and coding scheme offset value, the first uplink control information and the second uplink control information to the resource for the physical uplink shared channel, to transmit the first uplink control information and the second uplink control information to the network device using the resource for the physical uplink shared channel;
    wherein the obtaining the first modulation and coding scheme offset value comprises determining the first modulation and coding scheme offset value according to a format of the first downlink control information by determining, in response to the first downlink control information being compact downlink control information, that the first modulation and coding scheme offset value is a first preset value, wherein the first preset value is a value configured using at least one of higher layer signaling or a predefined value.

2. The method according to claim 1, further comprising:
    determining a format of the first downlink control information according to at least one of a quantity of bits in the first downlink control information, indication information of at least one preset bit field in the first downlink control information, or a type of search space that carries the first downlink control information.

3. The method according to claim 1, wherein the obtaining the second modulation and coding scheme offset value comprises:
    receiving higher layer signaling from the network device, wherein the higher layer signaling indicates the second modulation and coding scheme offset value used to multiplex the second uplink control information on the physical uplink shared channel; and
    obtaining, according to the higher layer signaling, the second modulation and coding scheme offset value used to multiplex the second uplink control information on the physical uplink shared channel.

4. The method according to claim 1, wherein the obtaining the second modulation and coding scheme offset value comprises:
  receiving at least one piece of second downlink control information from the network device, wherein the at least one piece of second downlink control information is associated with scheduling of at least one of a physical downlink shared channel and the second uplink control information, and wherein the resource for the physical uplink shared channel overlaps, in a time domain, with an uplink control channel resource that carries the second uplink control information; and
  obtaining, according to the at least one piece of second downlink control information, the second modulation and coding scheme offset value used to multiplex the second uplink control information on the physical uplink shared channel.

5. A method for uplink control information transmission, comprising:
  sending a first modulation and coding scheme offset value used to multiplex first uplink control information and a second modulation and coding scheme offset value used to multiplex second uplink control information to a terminal device, wherein the first modulation and coding scheme offset value is less than 1, and the second modulation and coding scheme offset value is greater than or equal to 1, wherein the sending a first modulation and coding scheme offset value comprises sending first downlink control information to the terminal device, wherein the first downlink control information is associated with scheduling of at least one of a physical uplink shared channel or the first uplink control information, and wherein a resource for the physical uplink shared channel overlaps, in a time domain, an uplink control channel resource that carries the first uplink control information, and wherein a format of the first downlink control information indicates the first modulation and coding scheme offset value; and
  receiving, from the terminal device, the first uplink control information and the second uplink control information on the physical uplink shared channel according to the first modulation and coding scheme offset value and the second modulation and coding scheme offset value, wherein a receiving time difference between the first downlink control information and at least one piece of second downlink control information indicates the second modulation and coding scheme offset value.

6. The method according to claim 5, wherein the sending a second modulation and coding scheme offset value comprises performing at least one of:
  sending higher layer signaling to the terminal device, wherein the higher layer signaling indicates the second modulation and coding scheme offset value used to multiplex the second uplink control information on the physical uplink shared channel; or
  sending at least one piece of second downlink control information to the terminal device, wherein the at least one piece of second downlink control information indicates the second modulation and coding scheme offset value used to multiplex the second uplink control information on the physical uplink shared channel.

7. The method according to claim 6, wherein a format of the at least one piece of second downlink control information indicates the second modulation and coding scheme offset value used to multiplex the second uplink control information on the physical uplink shared channel.

8. A communications device, comprising:
  a communications interface;
  a processor; and
  a non-transitory computer readable storage medium having a program stored thereon for execution by the processor, the program including instructions for:
    obtaining, from a network device, a first modulation and coding scheme offset value used to multiplex first uplink control information and a second modulation and coding scheme offset value used to multiplex second uplink control information, respectively, on a physical uplink shared channel, wherein the first modulation and coding scheme offset value is less than 1, and the second modulation and coding scheme offset value is greater than or equal to 1, wherein the obtaining the first modulation and coding scheme offset value comprises receiving first downlink control information, wherein the first downlink control information is associated with scheduling of at least one of the physical uplink shared channel or the first uplink control information, and wherein a resource for the physical uplink shared channel overlaps, in a time domain, with an uplink control channel resource that carries the first uplink control information; and
    mapping, respectively, according to the first modulation and coding scheme offset value and the second modulation and coding scheme offset value, the first uplink control information and the second uplink control information to the resource for the physical uplink shared channel, to transmit the first uplink control information and the second uplink control information to the network device using the resource for the physical uplink shared channel;
  wherein the instructions for obtaining the first modulation and coding scheme offset value include instructions for determining the first modulation and coding scheme offset value according to a format of the first downlink control information by determining, in response to the first downlink control information being compact downlink control information, that the first modulation and coding scheme offset value is a first preset value, wherein the first preset value is a value configured using at least one of higher layer signaling or a predefined value.

9. The communications device according to claim 8, wherein the program further includes instructions for:
  determining a format of the first downlink control information according to at least one of a quantity of bits in the first downlink control information, indication information of at least one preset bit field in the first downlink control information, or a type of search space that carries the first downlink control information.

10. The communications device according to claim 8, wherein the instructions for obtaining the second modulation and coding scheme offset value include instructions for:
  receiving higher layer signaling, wherein the higher layer signaling indicates the second modulation and coding scheme offset value used to multiplex the second uplink control information on the physical uplink shared channel; and
  wherein the program further includes instructions for obtaining, according to the higher layer signaling, the second modulation and coding scheme offset value used to multiplex the second uplink control information on the physical uplink shared channel.

11. The communications device according to claim 8, wherein the instructions for obtaining the second modulation and coding scheme offset value include instructions for:
receiving at least one piece of second downlink control information, wherein the at least one piece of second downlink control information is associated with scheduling of a physical downlink shared channel and the second uplink control information, and wherein the resource for the physical uplink shared channel overlaps, in a time domain, an uplink control channel resource that carries the second uplink control information; and
wherein the program further includes instructions for obtaining, according to the at least one piece of second downlink control information, the second modulation and coding scheme offset value used to multiplex the second uplink control information on the physical uplink shared channel.

12. The method according to claim 1, wherein the first modulation and coding scheme offset value and the second modulation and coding scheme offset value are respectively associated with a reliability requirement for transmitting the first uplink control information.

13. The method according to claim 5, wherein the first modulation and coding scheme offset value and the second modulation and coding scheme offset value are respectively associated with a reliability requirement for transmitting the first uplink control information.

14. The communications device according to claim 8, wherein the first modulation and coding scheme offset value and the second modulation and coding scheme offset value are respectively associated with a reliability requirement for transmitting the first uplink control information.

* * * * *